US011345069B2

(12) United States Patent
Yamaya et al.

(10) Patent No.: US 11,345,069 B2
(45) Date of Patent: May 31, 2022

(54) MANUFACTURING METHOD OF POLYGONAL MIRROR, POLYGONAL MIRROR, DEFLECTOR, OPTICAL SCANNING APPARATUS AND IMAGE FORMING APPARATUS

(71) Applicant: CANON KABUSHIKI KAISHA, Tokyo (JP)

(72) Inventors: Fumihiko Yamaya, Mishima (JP); Hiroki Katayama, Suntou-gun (JP); Yoshihiko Tanaka, Mishima (JP); Takatoshi Tanaka, Atami (JP); Mitsuhiro Ohta, Yokohama (JP); Atsushi Takata, Yokohama (JP); Naoki Matsushita, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 350 days.

(21) Appl. No.: 16/383,937

(22) Filed: Apr. 15, 2019

(65) Prior Publication Data
US 2019/0322021 A1 Oct. 24, 2019

(30) Foreign Application Priority Data
Apr. 24, 2018 (JP) .............................. JP2018-082893

(51) Int. Cl.
*B29C 45/26* (2006.01)
*B29D 11/00* (2006.01)
(Continued)

(52) U.S. Cl.
CPC .... *B29C 45/2602* (2013.01); *B29D 11/00596* (2013.01); *G02B 5/09* (2013.01);
(Continued)

(58) Field of Classification Search
CPC ............. G02B 5/09; G02B 5/10; G02B 26/12
See application file for complete search history.

(56) References Cited

U.S. PATENT DOCUMENTS

| 4,101,365 A | | 7/1978 | Fisli |
| 5,239,403 A | * | 8/1993 | Shiraishi .............. G02B 26/121 |
| | | | 250/236 |

(Continued)

FOREIGN PATENT DOCUMENTS

| EP | 0 348 232 A2 | 12/1989 |
| JP | 60-178817 U | 11/1985 |

(Continued)

OTHER PUBLICATIONS

Machine translation of Copal, JP H06-43079 B2 (Year: 1994).*

(Continued)

*Primary Examiner* — Kimberly N. Kakalec
(74) *Attorney, Agent, or Firm* — Venable LLP

(57) ABSTRACT

A manufacturing method of a polygonal mirror using a metal mold including a first mold, a second mold, a third mold, and a fourth mold includes a step of forming the molded member by providing the third mold and the fourth mold between the first mold and the second mold in a state in which the third mold and the fourth mold are in contact with each other and then by injecting a resin material into the metal mold, and a step of separating the third mold from the first crossing surface of the molded member in a direction crossing the first crossing surface.

11 Claims, 18 Drawing Sheets

(51) Int. Cl.

| | | |
|---|---|---|
| *G02B 5/09* | (2006.01) | |
| *G02B 26/12* | (2006.01) | |
| *G03G 15/04* | (2006.01) | |
| *G02B 5/10* | (2006.01) | |
| *B29L 11/00* | (2006.01) | |

(52) U.S. Cl.
CPC ............... *G02B 5/10* (2013.01); *G02B 26/12* (2013.01); *G03G 15/04036* (2013.01); *B29L 2011/0058* (2013.01)

(56) References Cited

U.S. PATENT DOCUMENTS

| | | | |
|---|---|---|---|
| 5,296,959 | A | 3/1994 | Asai |
| 5,561,545 | A | 10/1996 | Kaino et al. |
| 5,574,592 | A * | 11/1996 | Sano ..................... G02B 5/09 359/216.1 |
| 9,778,457 | B2 | 10/2017 | Hayakawa et al. |
| 9,939,566 | B2 | 4/2018 | Hoshino et al. |
| 2003/0184888 | A1 | 10/2003 | Hosonuma |
| 2007/0146852 | A1* | 6/2007 | Itami ..................... G03G 15/04 359/200.1 |
| 2008/0239060 | A1 | 10/2008 | Jo et al. |
| 2017/0343798 | A1 | 11/2017 | Hayakawa et al. |
| 2019/0091954 | A1 | 3/2019 | Takata |
| 2019/0322022 | A1 | 10/2019 | Ohta et al. |
| 2019/0322023 | A1 | 10/2019 | Matsushita et al. |

FOREIGN PATENT DOCUMENTS

| | | | | |
|---|---|---|---|---|
| JP | 62119514 | A * | 5/1987 | ............... G02B 5/09 |
| JP | 01020518 | A * | 1/1989 | ............... G02B 5/09 |
| JP | 1-140115 | A | 6/1989 | |
| JP | 3-142210 | A | 6/1991 | |
| JP | 4-253021 | A | 9/1992 | |
| JP | 4-353816 | A | 12/1992 | |
| JP | 5-60995 | A | 3/1993 | |
| JP | 6-43079 | B2 | 6/1994 | |
| JP | 8-251725 | A | 9/1996 | |
| JP | 2015-152652 | A | 8/2015 | |
| JP | 6061086 | B2 | 1/2017 | |
| JP | 2017-72660 | A | 4/2017 | |

OTHER PUBLICATIONS

Machine translation of JP-62119514-A. (Year: 1987).*
Machine translation of JP S-43079. (Year: 1994).*
Extended European Search Report in European Application No. 19 168 033.9 (dated Feb. 18, 2020).
Partial European Search Report in European Application No. 19 168 033.9 (dated Sep. 9, 2019).
Communication Pursuant to Article 94(3) EPC in European Application No. 19 168 033.9 (dated Apr. 2021).
Matsushita et al., U.S. Appl. No. 16/386,648, filed Apr. 17, 2019.
Ohta et al., U.S. Appl. No. 16/383,948, filed Apr. 15, 2019.
First Office Action in Chinese Application No. 201910331270.3 (dated Jul. 2021).
Notification of Ground of Rejection in Japanese Application No. 2018-082893 (dated Feb. 2022).

* cited by examiner (a)

(b)

(a)

(b)

MANUFACTURING METHOD OF POLYGONAL MIRROR, POLYGONAL MIRROR, DEFLECTOR, OPTICAL SCANNING APPARATUS AND IMAGE FORMING APPARATUS

FIELD OF THE INVENTION AND RELATED ART

The present invention relates to a manufacturing method of a polygonal mirror for scanning an image bearing member with laser light, the polygonal mirror manufactured by the manufacturing method, a deflector including the polygonal mirror, an optical scanning apparatus including the deflector, and an image forming apparatus including the optical scanning apparatus.

In a conventional optical scanning apparatus used in an image forming apparatus such as a laser printer, laser light emitted from a light source is optically modulated depending on an image signal, and the modulated laser light is deflected by a deflector comprising, for example, a polygonal mirror and then a photosensitive drum is scanned with the deflected laser light, so that an image is formed on the photosensitive drum by a scanning lens such as an fθ lens and thus an electrostatic latent image is formed on the photosensitive drum. Then, the electrostatic latent image on the photosensitive drum is visualized (developed) into a toner image by a developing device, and the toner image is transferred onto a recording material such as recording paper and is sent to a fixing device, and then the toner image (toner) on the recording material is heat-fixed on the recording material, so that printing is carried out.

Conventionally, a scanner motor which is the deflector used in the optical scanning apparatus is constituted by the polygonal mirror, a rotor, a rotation shaft provided integrally with the rotor, a seat (base) for mounting the polygonal mirror, a bearing sleeve provided integrally with a substrate, a stator, and the like. Further, the polygonal mirror is provided with a bearing surface contacting the seat when the polygonal mirror is mounted on the seat.

The polygonal mirror mounted in the deflector has been conventionally made of a metal material such as aluminum. Reflecting surfaces of the polygonal mirror are formed by individually rubbing (polishing) a base material as disclosed in Japanese Patent No. 6061086. For example, as shown in FIG. 19, in a manufacturing step of four reflecting surfaces (reflecting sides) of a rotatable polygonal mirror, the four reflecting surfaces are individually rubbed along a widthwise direction of the reflecting surfaces in the order of a side (surface) 4, a side (surface) 3, a side (surface) 2 and a side (surface) 1. As a result, in some cases, a burr projecting from the side 1 toward the side 4 exists at a boundary portion between the side 1 and the side 4. A polygonal mirror made of a resin material as disclosed in Japanese Laid-Open Patent Application (JP-A) 2015-152652 has also been proposed. Compared with the polygonal mirror made of the metal material, the polygonal mirror made of the resin material has advantages such that a cost can be reduced and that latitude in shape can be ensured. The polygonal mirror made of the resin material is formed by injection molding and goes mainstream, and a polygonal mirror as disclosed in JP-A 2017-72660 and a structure of a molding type have been disclosed.

However, as regards the polygonal mirror made of the resin material, compared with the polygonal mirror made of the metal material, reflecting surfaces of the polygonal mirror made of the resin material is not readily formed with high accuracy. As a main function of the polygonal mirror, there is a need to deflect a laser light flux to an accurate position. For that reason, the polygonal mirror is required to provide very high accuracy of unevenness and angle of the reflecting surfaces. In a constitution disclosed in JP-A 2017-72660, the polygonal mirror made of the resin material is subjected to a shearing force at reflecting surfaces thereof from a metal mold during parting in injection molding, and therefore, deformation of the reflecting surface is caused to occur, so that there is a liability that profile irregularity cannot be ensured (FIG. 7 of JP-A 2017-72660).

SUMMARY OF THE INVENTION

A principal object of the present invention is to reduce a degree of deformation of a reflecting surface of a polygonal mirror during parting of the polygonal mirror.

According to an aspect of the present invention, there is provided a manufacturing method of a polygonal mirror using a metal mold including, a first mold including a first molding surface for molding one surface of a molded member for the polygonal mirror, a second mold including a second surface for molding the other surface of the molded member on a side opposite from the one surface of the molded member, a third mold including a third molding surface for molding a first crossing surface crossing the one surface and the other surface between the one surface and the other surface of the molded member, and a fourth mold including a fourth molding surface for molding a second crossing surface crossing the one surface and the other surface between the one surface and the other surface of the molded member, the manufacturing method comprising: a step of forming the molded member by providing the third mold and the fourth mold between the first mold and the second mold in a state in which the third mold and the fourth mold are in contact with each other and then by injecting a resin material into the metal mold; and a step of separating the third mold from the first crossing surface in a direction crossing the first crossing surface of the molded member.

Further features of the present invention will become apparent from the following description of exemplary embodiments with reference to the attached drawings.

Figure 5:
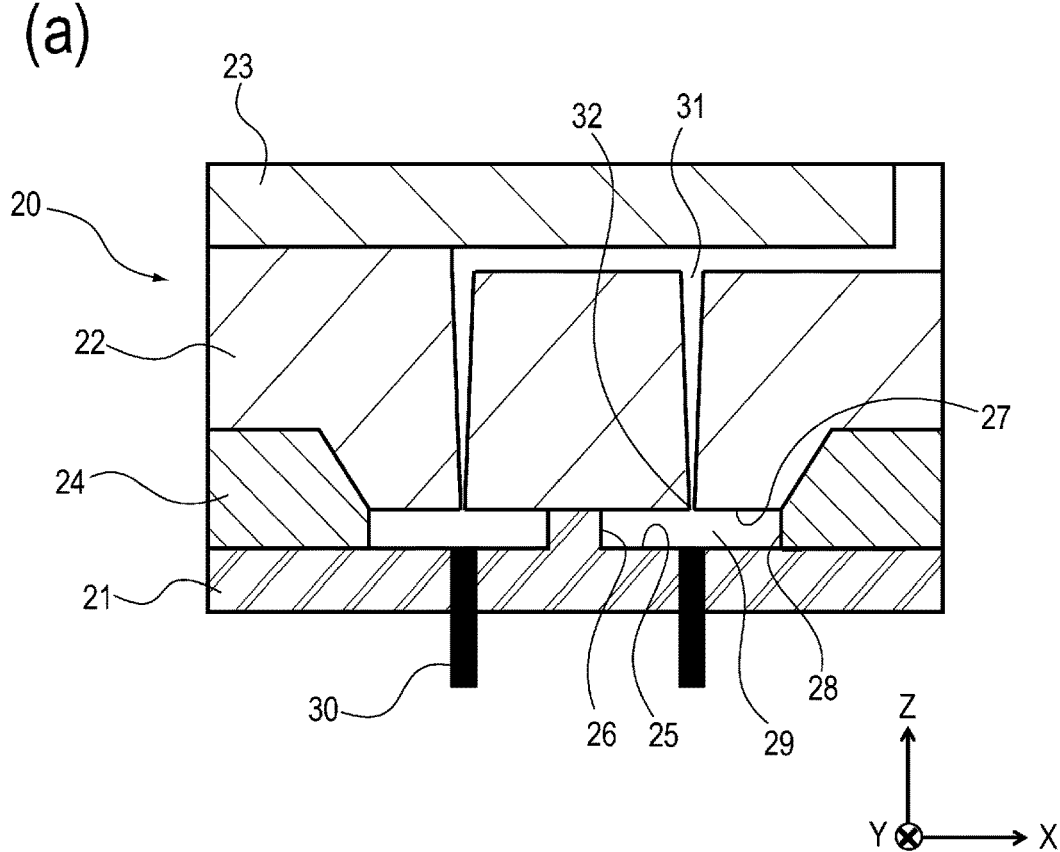
Figure 5:
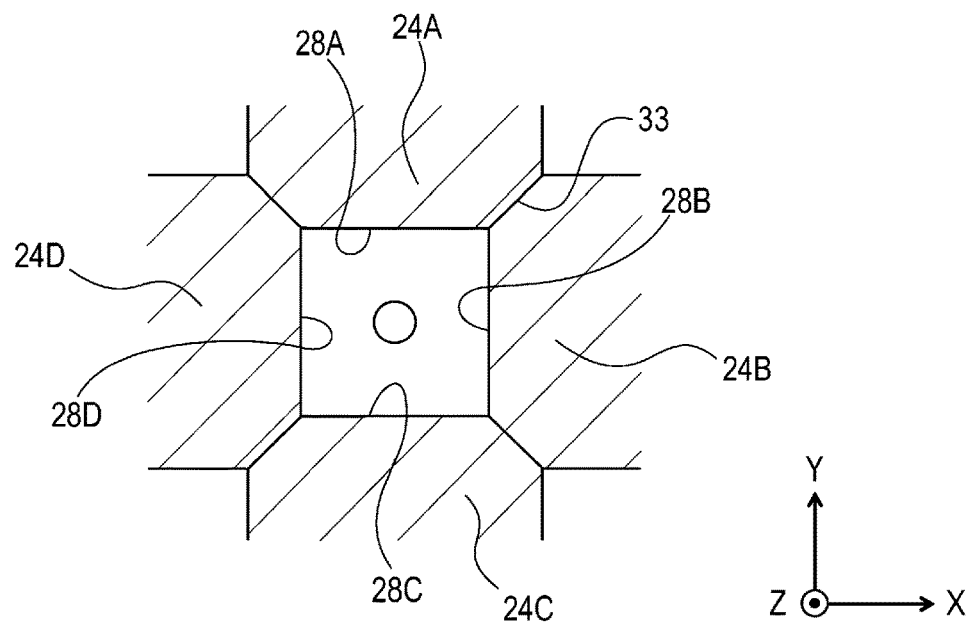

Part (a) of FIG. 5 is an illustration of a metal mold for the polygonal mirror according to Embodiment 1, and part (b) of FIG. 5 is an arrangement illustration of reflecting surface dies of the metal mold in Embodiment 1.

Figure 6:
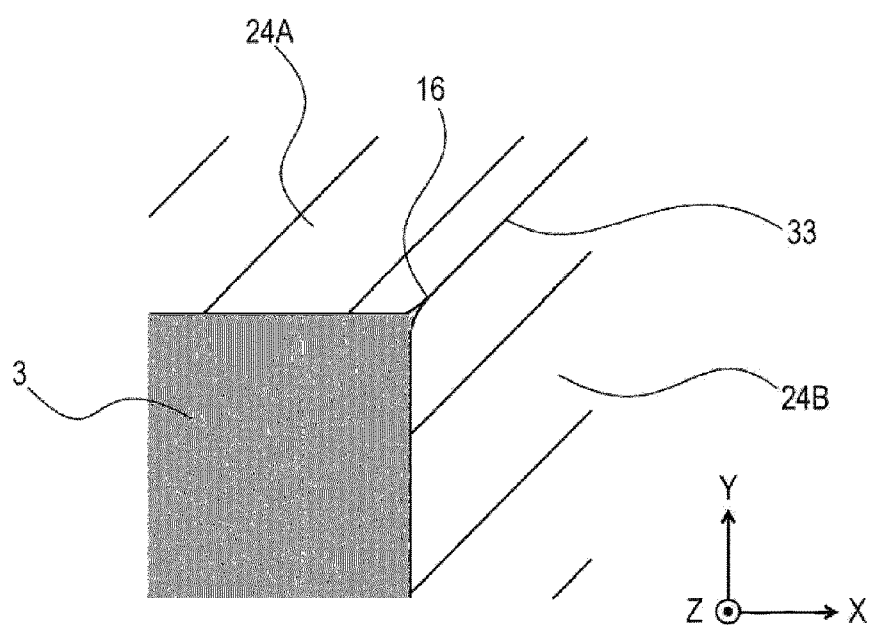
Figure 6:
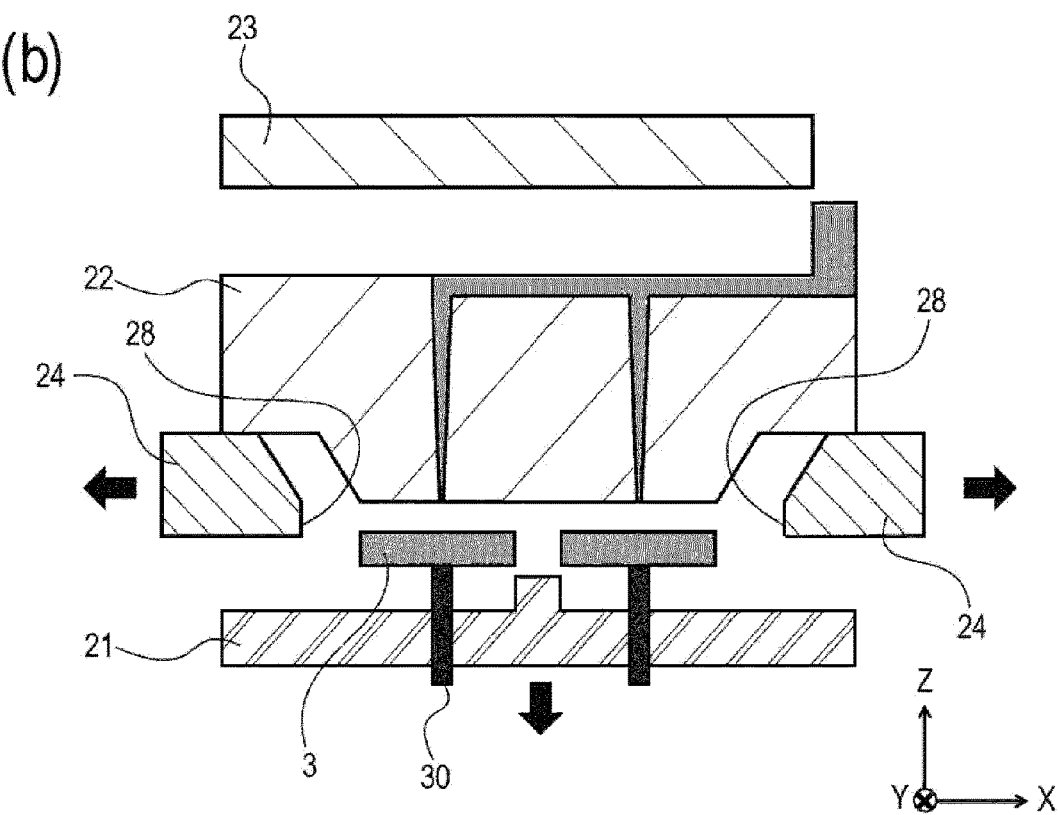

Part (a) of FIG. 6 is an illustration of a parting line at a contact position of the reflecting surface dies in Embodiment 1, and part (b) of FIG. 6 is an illustration of the polygonal mirror during parting of the polygonal mirror of Embodiment 1.

Figure 7:
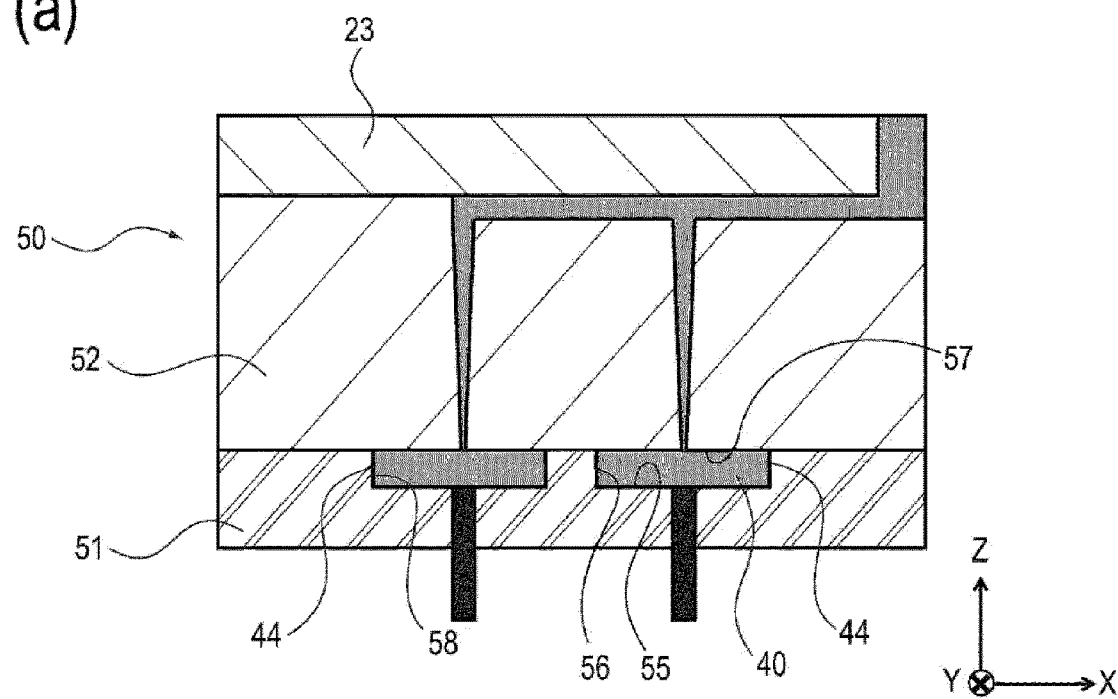
Figure 7:
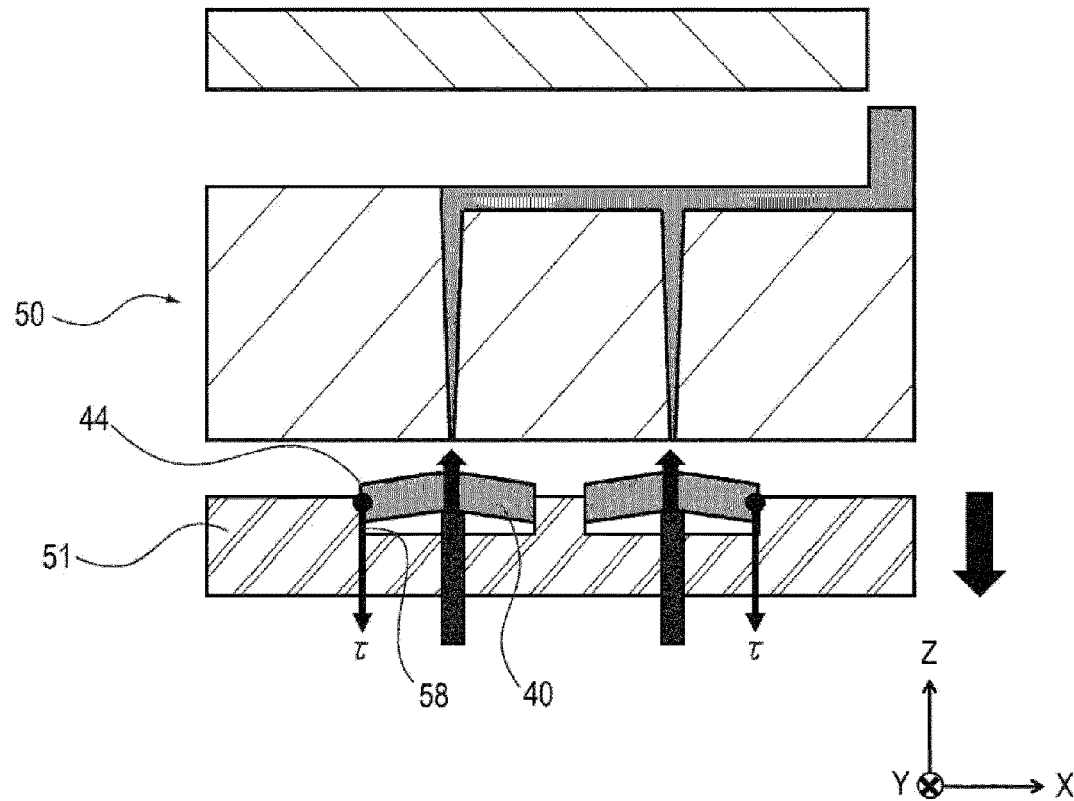

Part (a) of FIG. 7 is an illustration of a metal mold for molding a polygonal mirror according to Comparison Example, and part (b) of FIG. 7 is an illustration of the polygonal mirror during parting of the polygonal mirror of Comparison Example 1.

Figure 8:
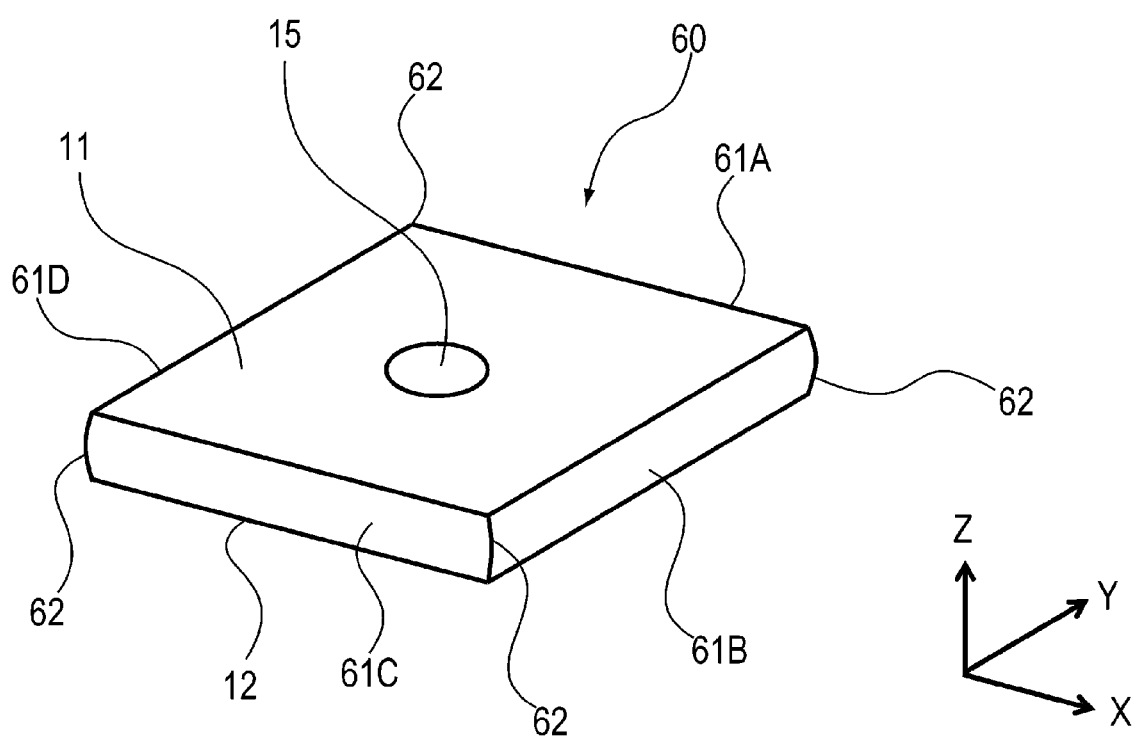

FIG. 8 is a perspective view of a polygonal mirror according to a modified embodiment of Embodiment 1.

Figure 9:
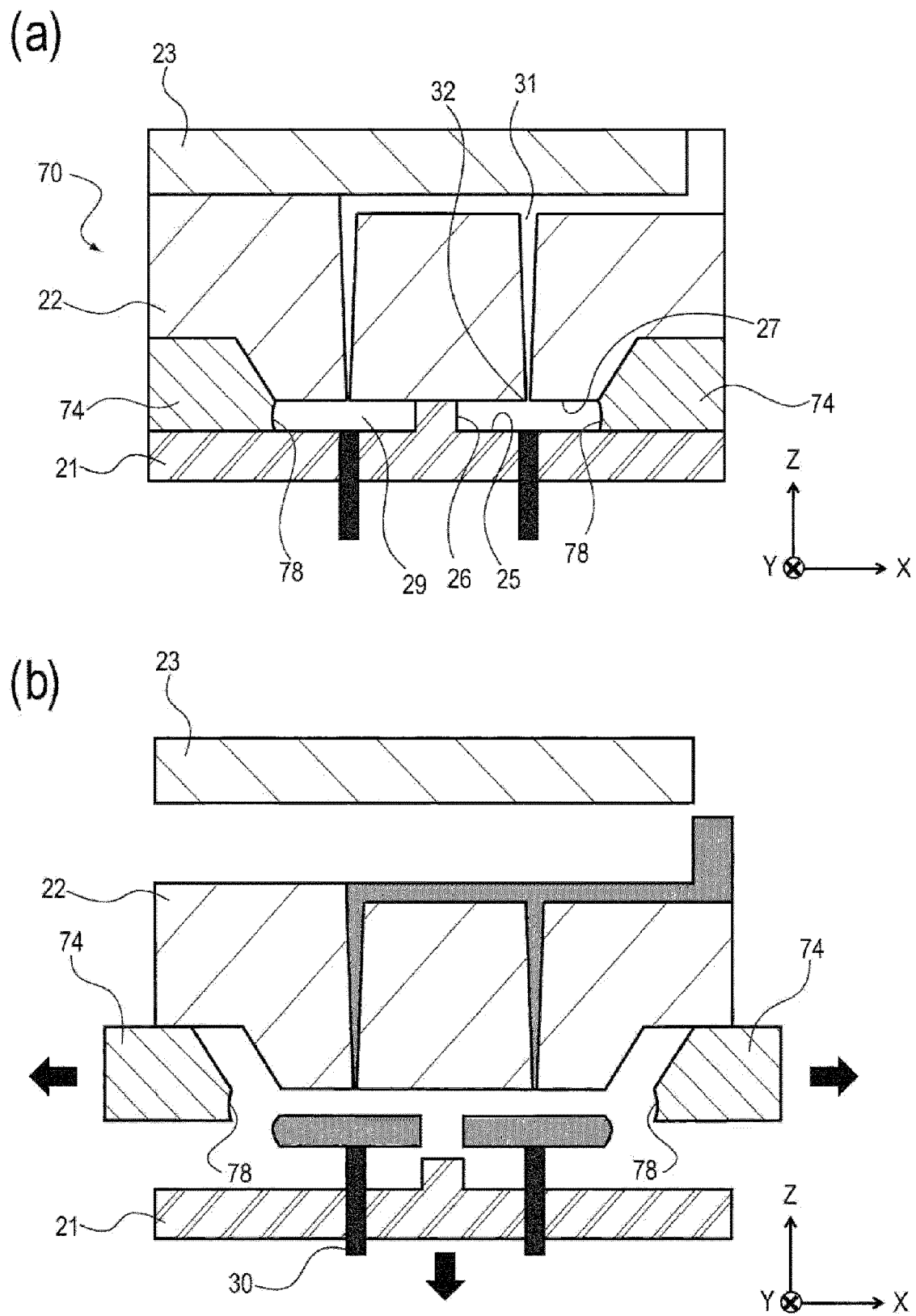

Part (a) of FIG. 9 is an illustration of a metal mold for a polygonal mirror according to the modified embodiment of Embodiment 1, and part (b) of FIG. 9 is an illustration of the polygonal mirror during parting of the polygonal mirror in the modified embodiment of Embodiment 1.

Figure 10:
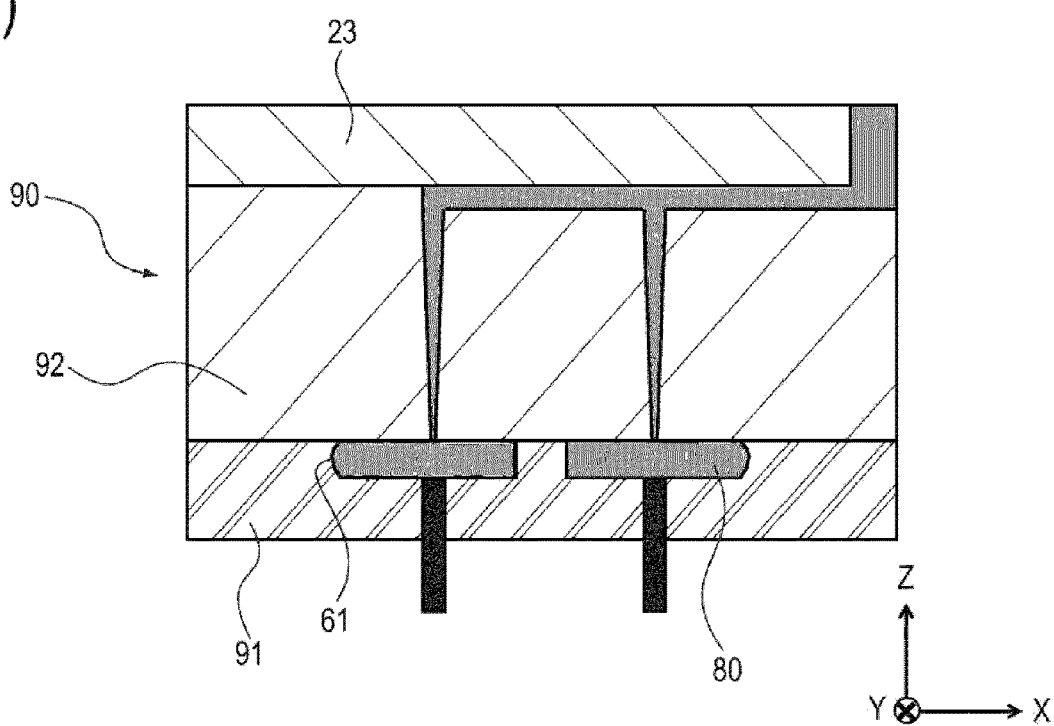
Figure 10:
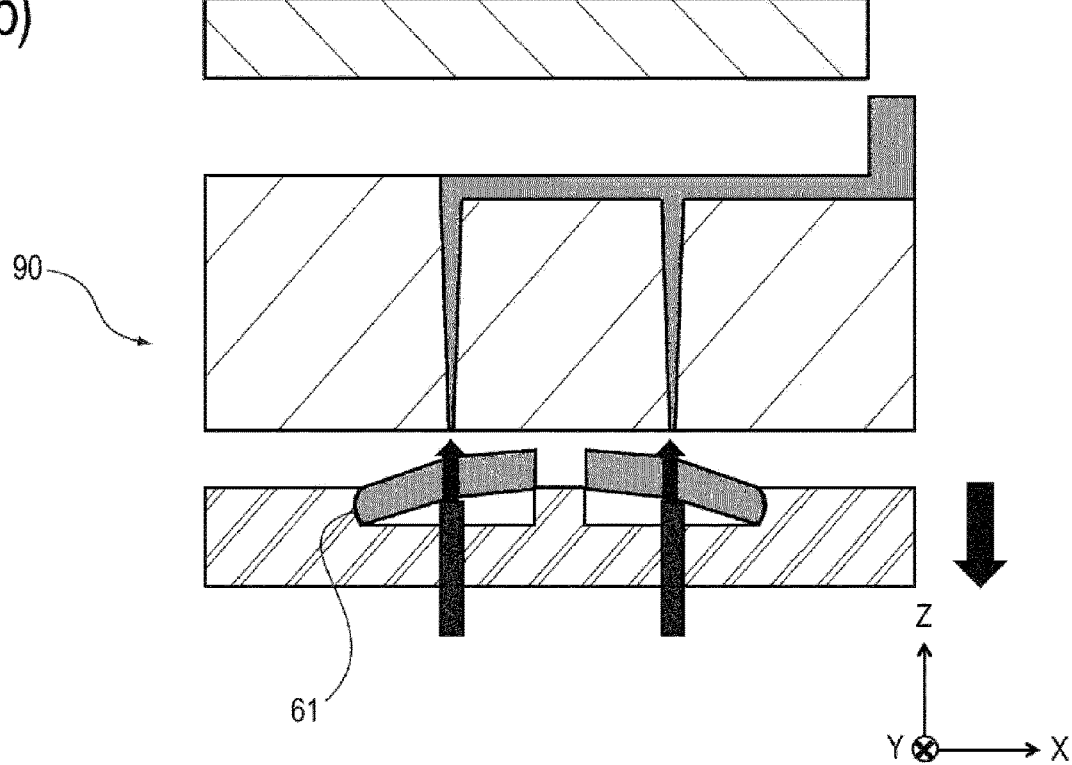

Part (a) of FIG. 10 is an illustration of a metal mold for molding a polygonal mirror according to Comparison Example 2, and part (b) of FIG. 10 is an illustration of the polygonal mirror during parting of the polygonal mirror of Comparison Example 2.

Figure 11:
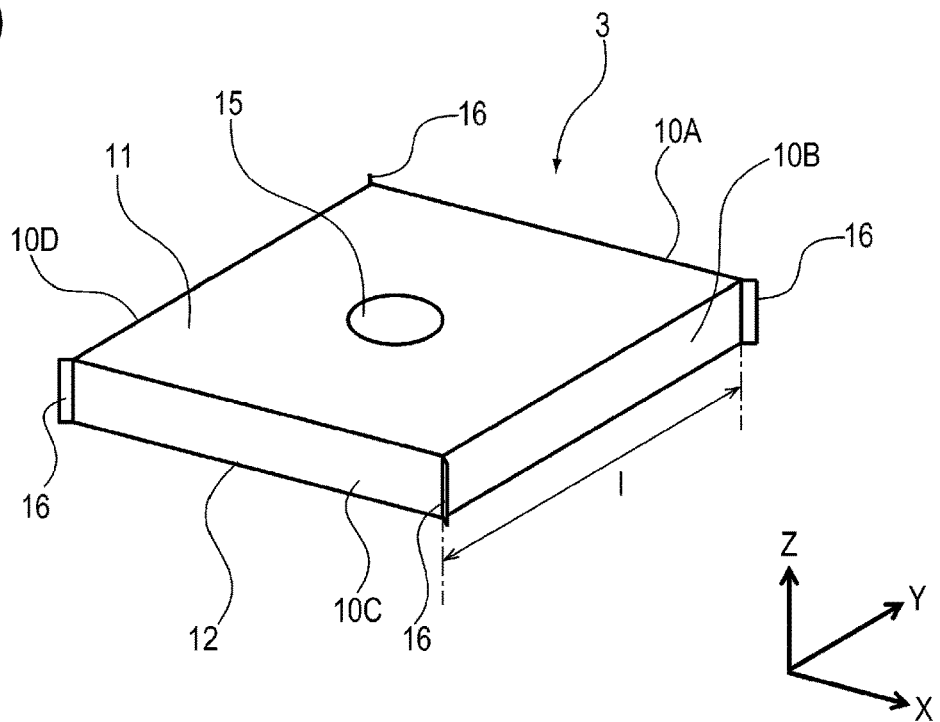
Figure 11:
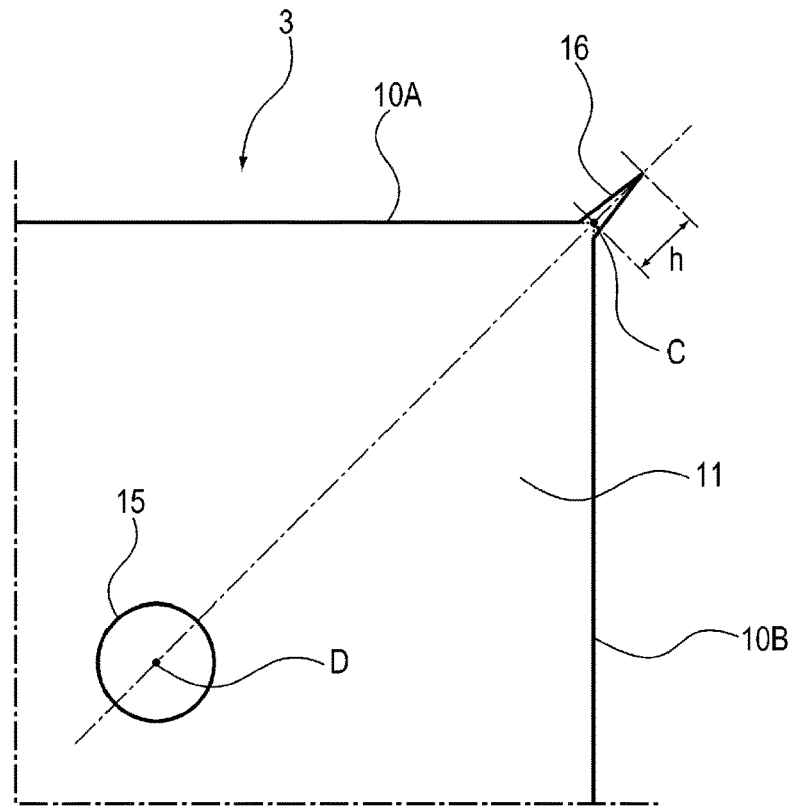

Parts (a) and (b) of FIG. 11 are illustrations of the polygonal mirror of Embodiment 1.

Figure 12:
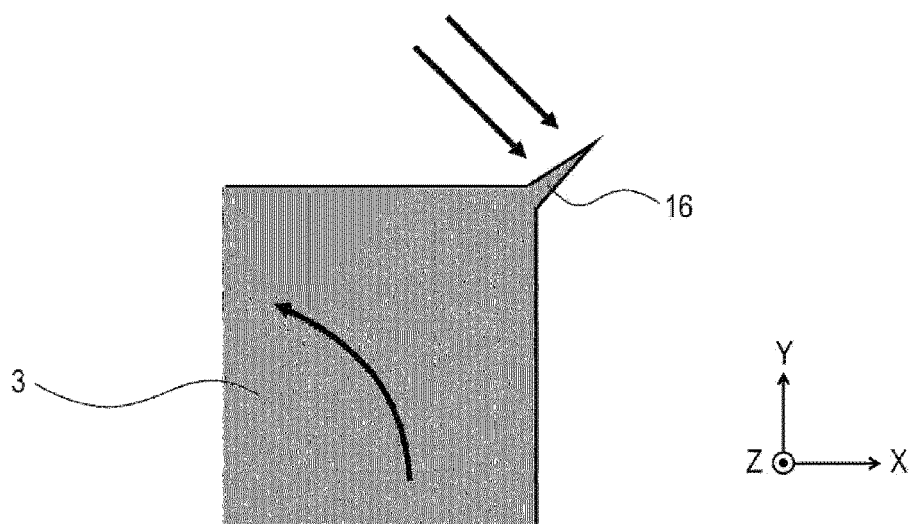
Figure 12:
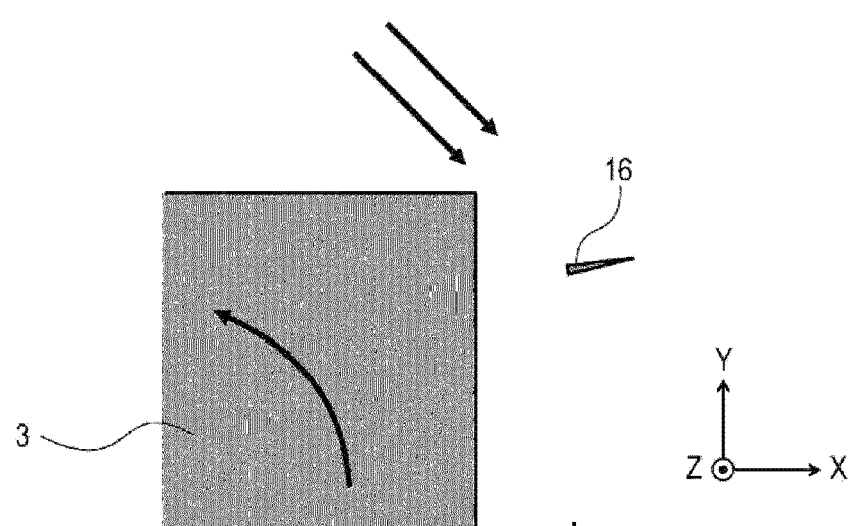
Figure 12:
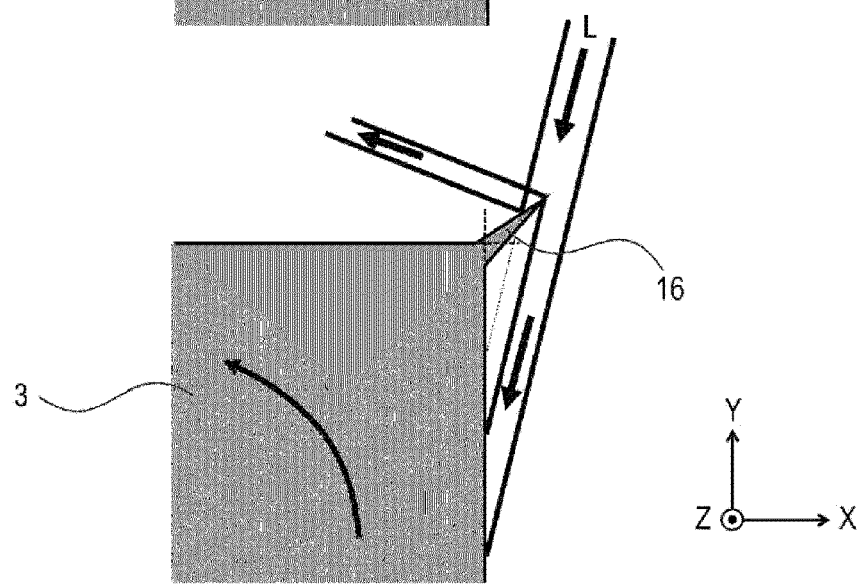

Parts (a), (b) and (c) of FIG. 12 are enlarged views of the polygonal mirror of Embodiment 1.

Figure 13:
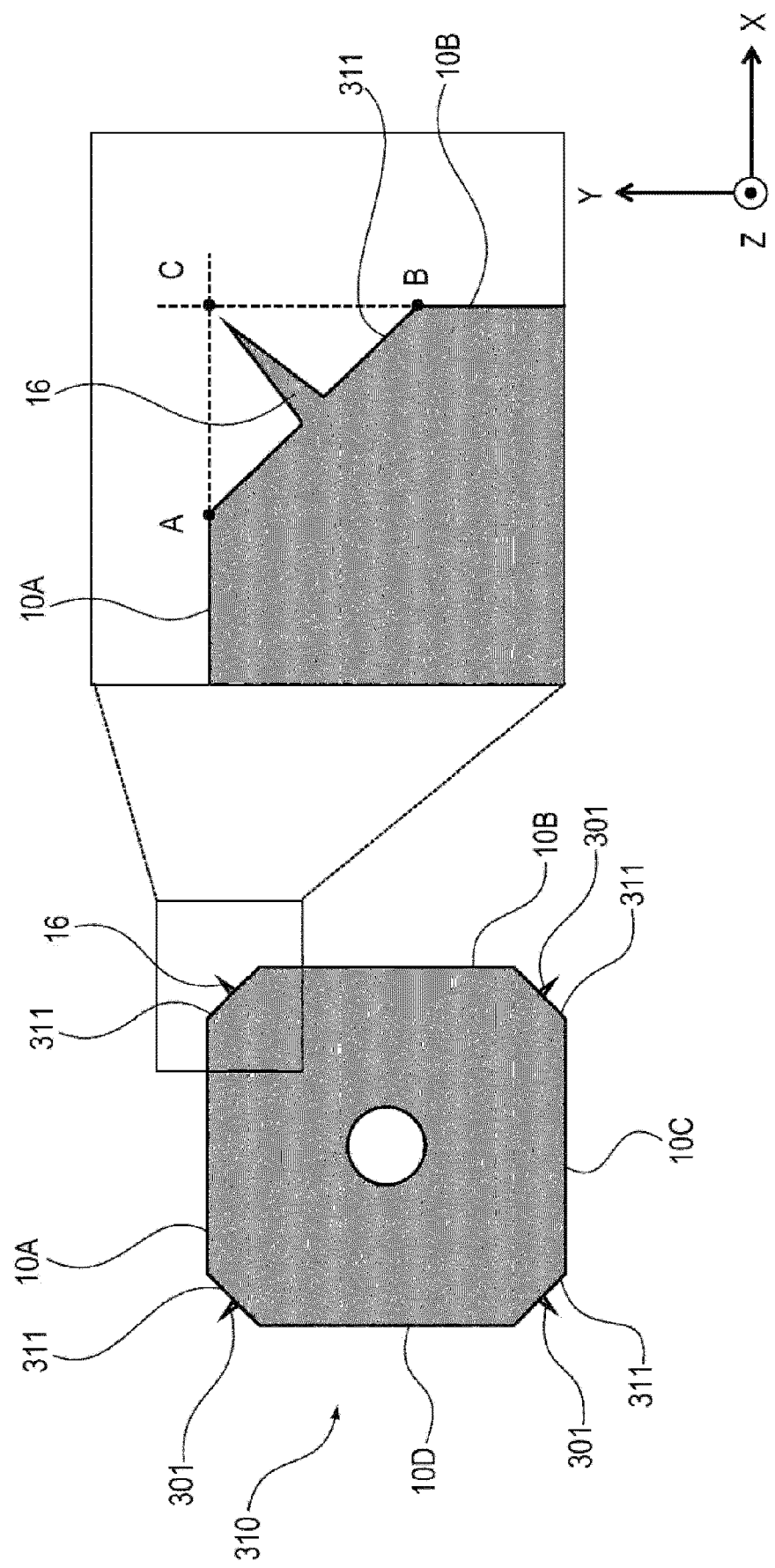

FIG. 13 is an illustration of a polygonal mirror according to Embodiment 2.

Figure 14:
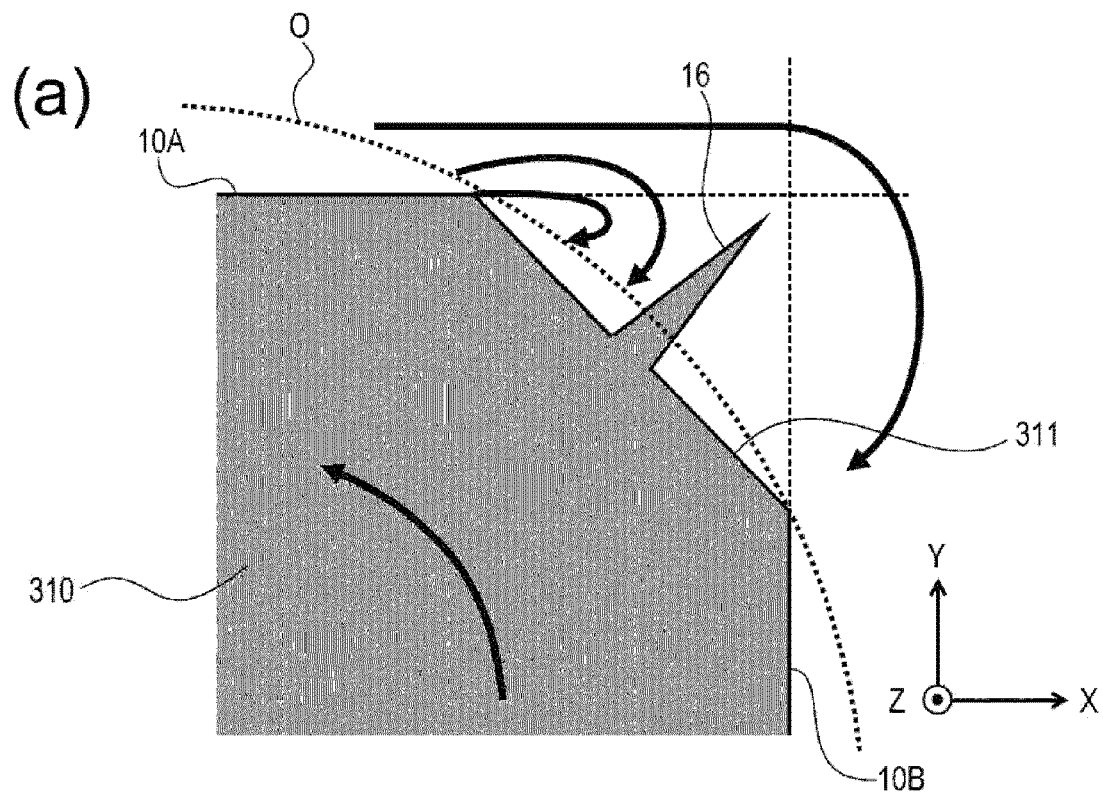
Figure 14:
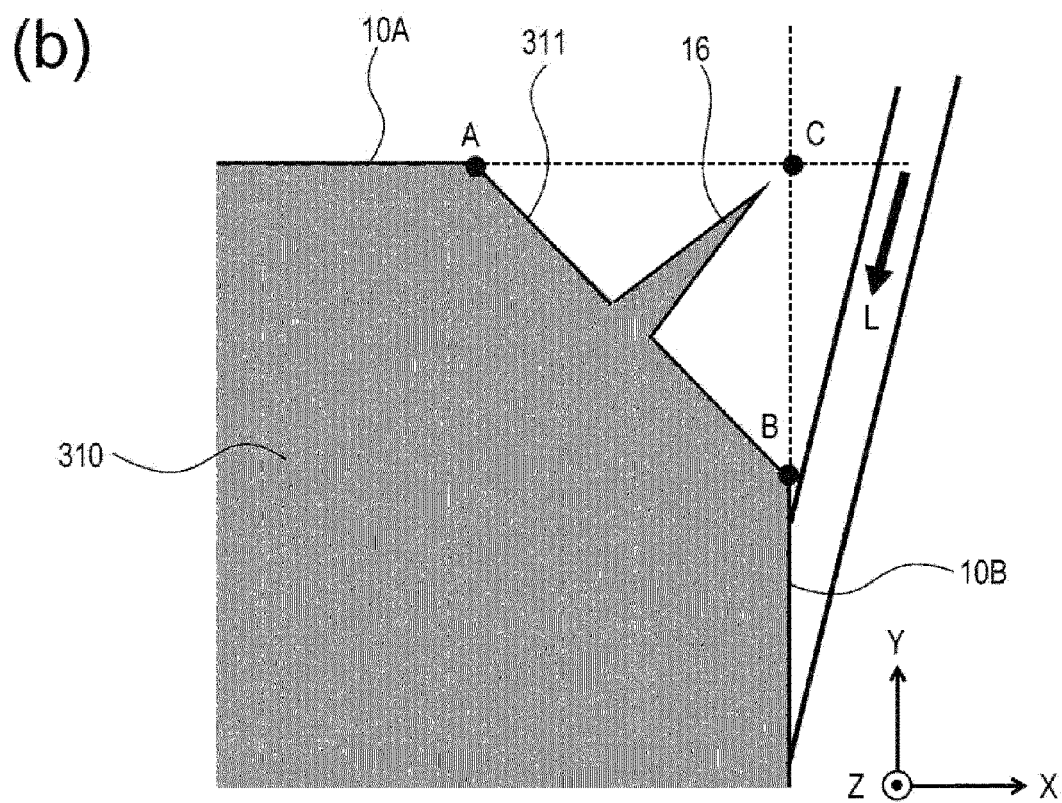

Parts (a) and (b) of FIG. 14 are enlarged views of the polygonal mirror of Embodiment 2.

Figure 15:
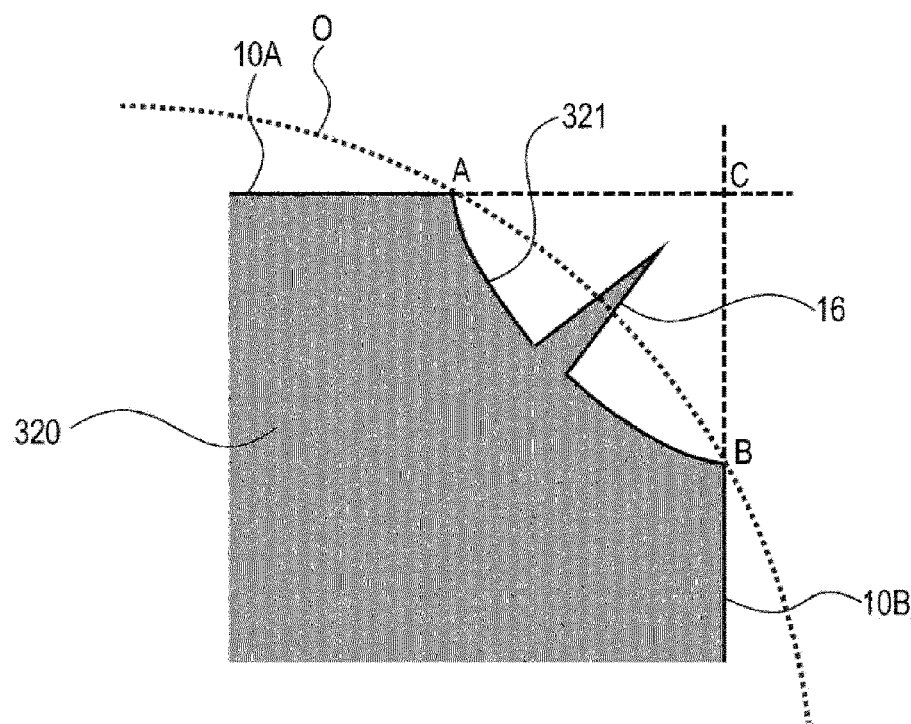
Figure 15:
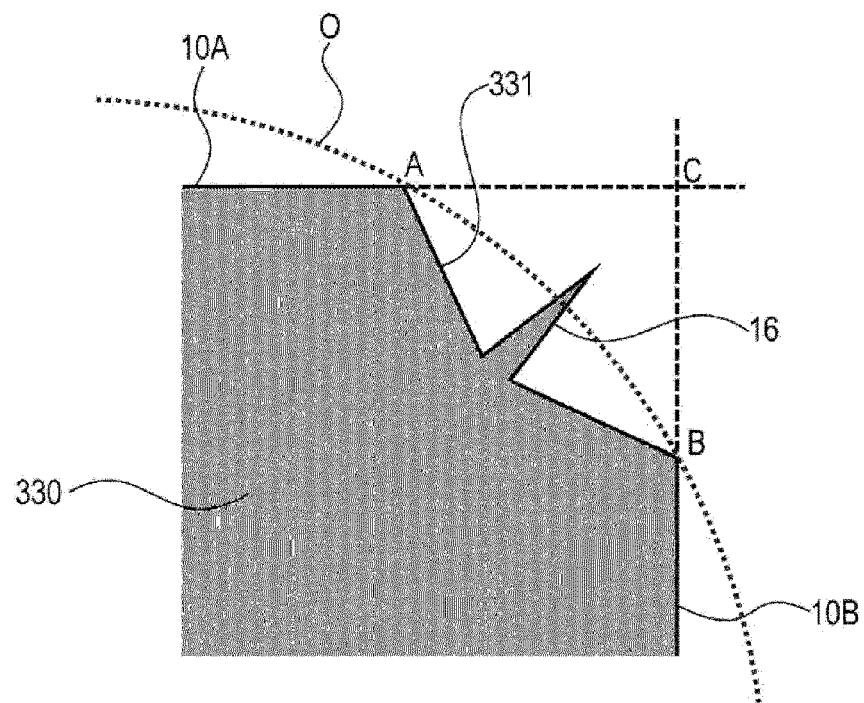

Parts (a) and (b) of FIG. 15 are enlarged views of a connecting portion of the polygonal mirror of Embodiment 2.

Figure 16:
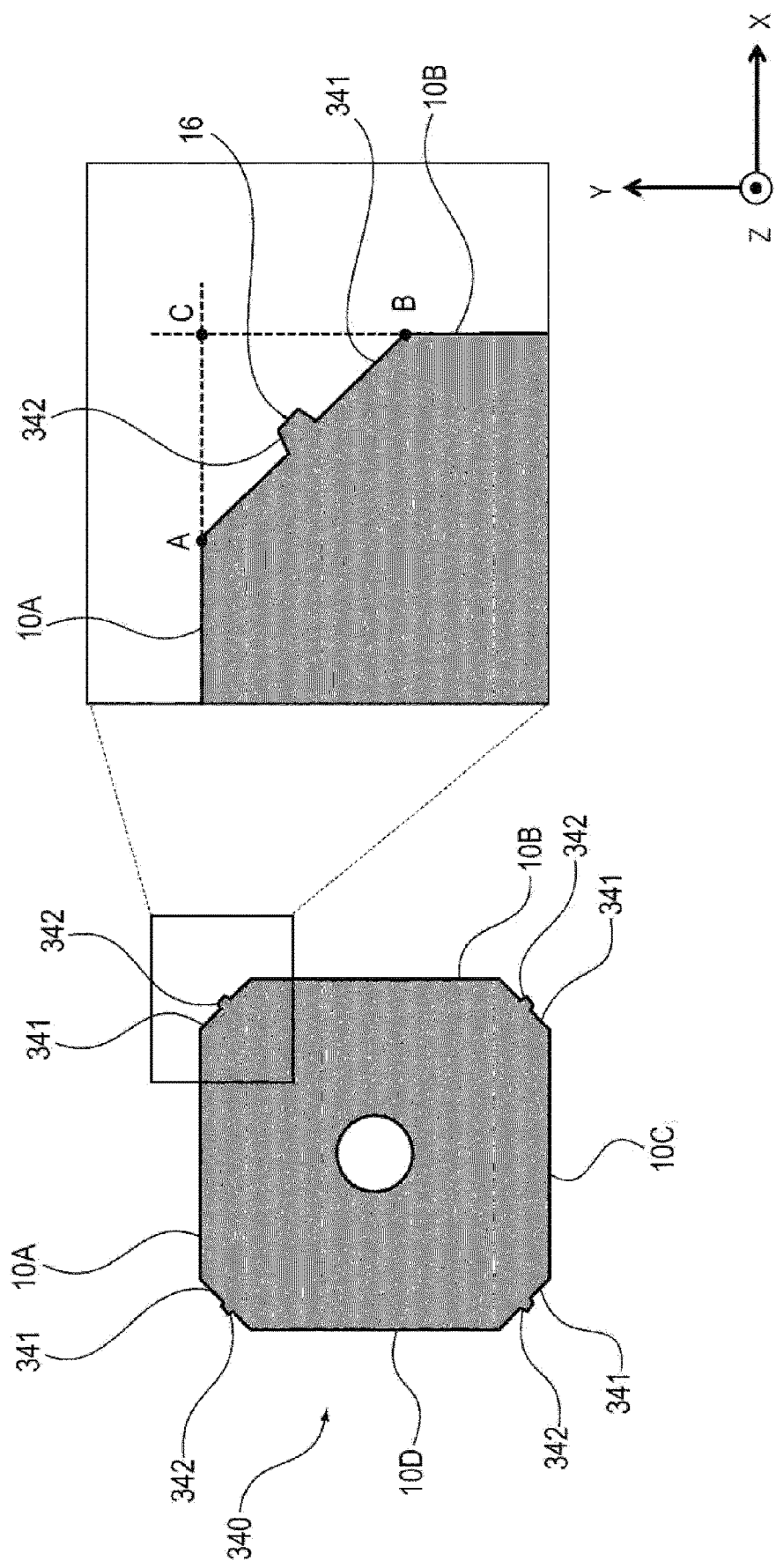

FIG. 16 is an illustration of a polygonal mirror according to Embodiment 3.

Figure 17:
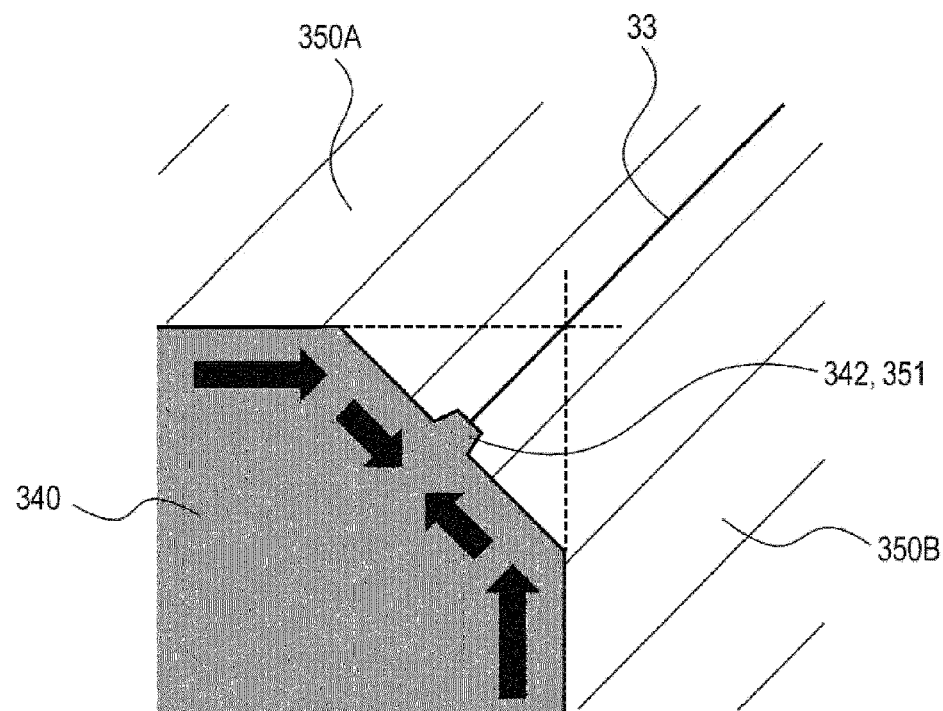
Figure 17:
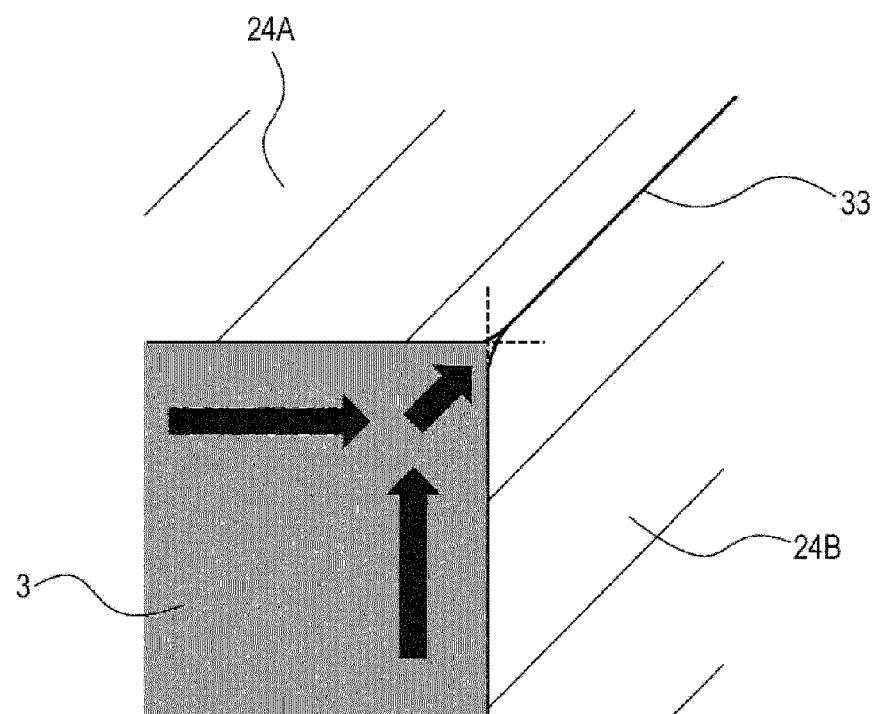

Parts (a) and (b) of FIG. 17 are enlarged views of the polygonal mirror of Embodiment 3.

Figure 18:
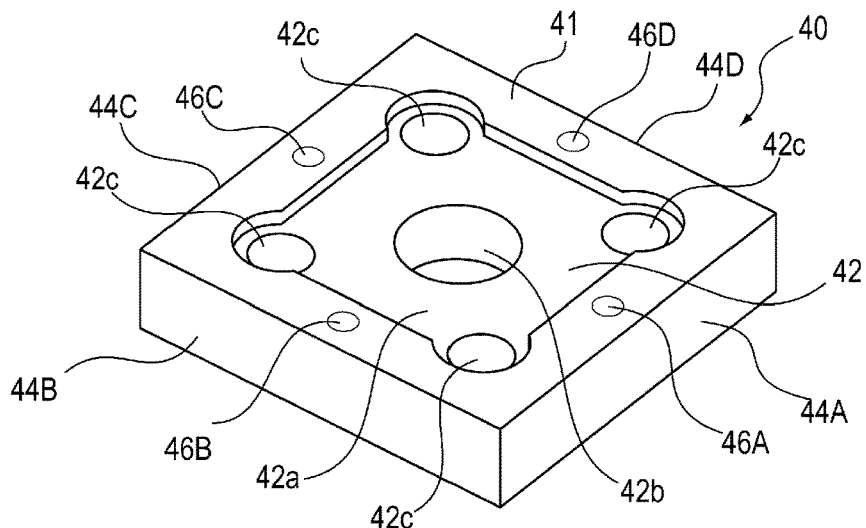
Figure 18:
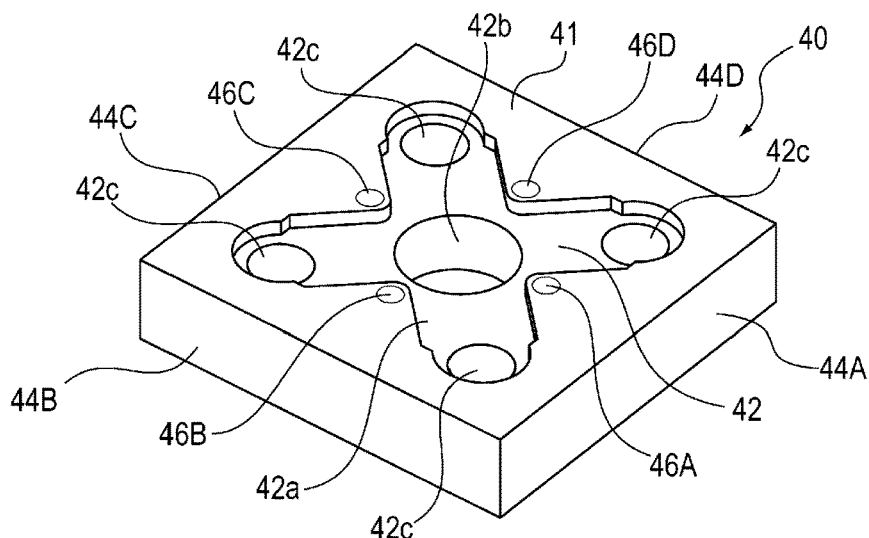
Figure 18:
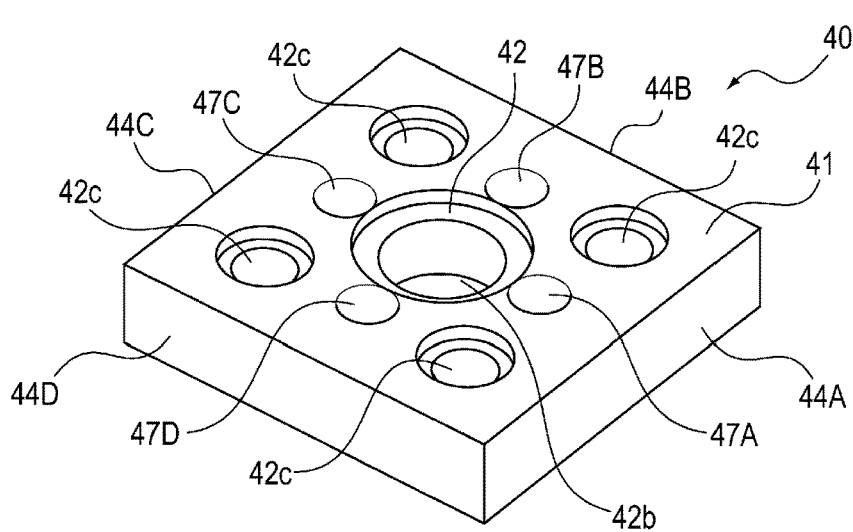

Parts (a) and (b) of FIG. 18 are perspective views of polygonal mirrors according to other embodiments as seen from top surface sides of the polygonal mirrors, and part (c) of FIG. 16 is a perspective view of a polygonal mirror according to another embodiment as seen from a bottom (surface) side of the polygonal mirror.

Figure 19:
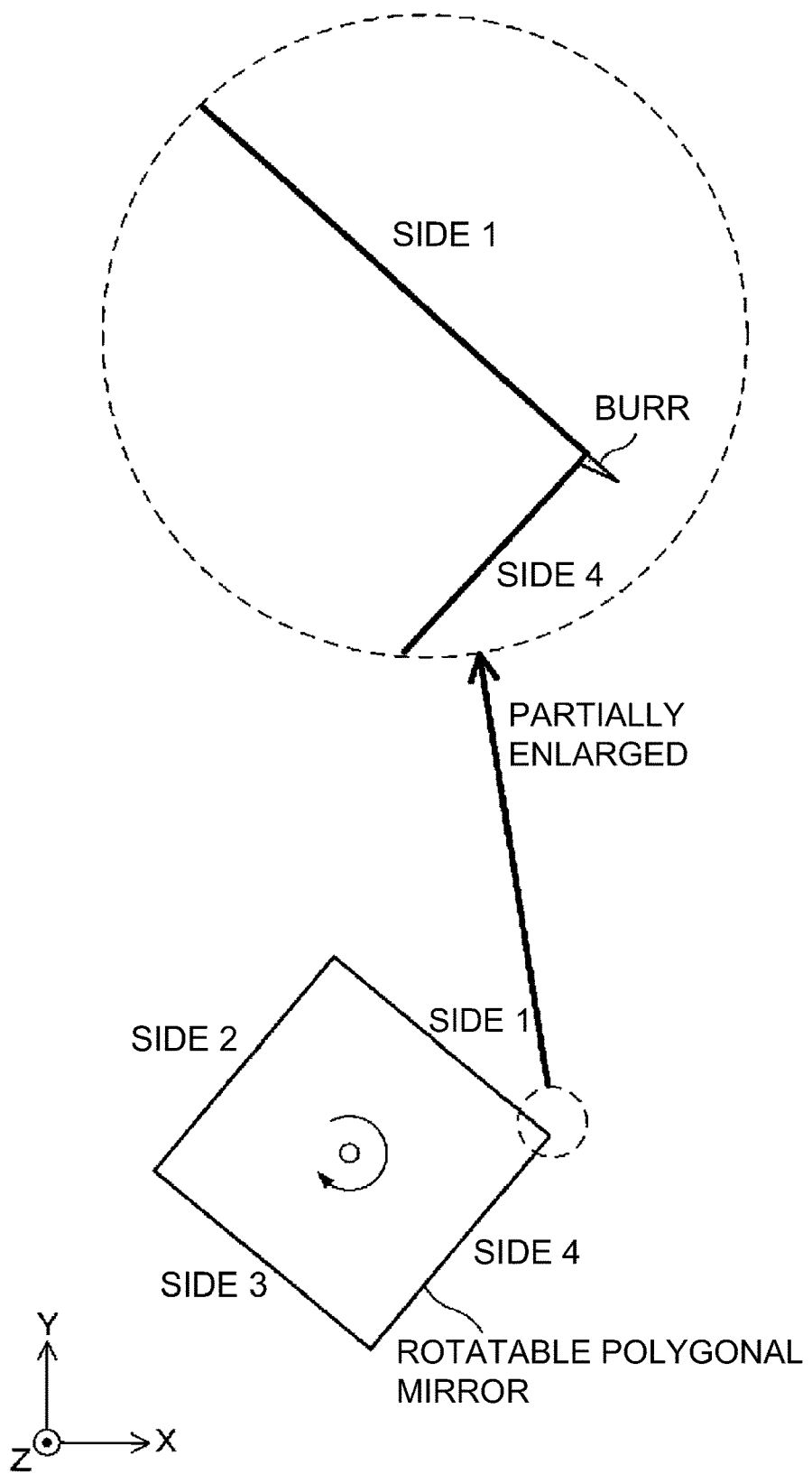

FIG. 19 is an illustration of a conventional polygonal mirror.

DESCRIPTION OF EMBODIMENTS

Embodiments of the present invention will be specifically described with reference to the drawings. Dimensions, materials, shapes and relative arrangements of constituent elements described in the following embodiments should be appropriately be changed depending on structures and various conditions of devices (apparatuses) to which the present invention is applied. Accordingly, the scope of the present invention is not intended to be limited to the following embodiments unless otherwise specified.

Embodiment 1

With reference to the drawings, an image forming apparatus including an optical scanning apparatus according to Embodiment 1 will be described. In the following description, first, the image forming apparatus including the optical scanning apparatus will be described as an example, and then the optical scanning apparatus in the image forming apparatus will be described. Then, a scanner motor which is a deflector, and a polygonal mirror which are assembled in the optical scanning apparatus will be described. Then, a metal mold used for molding the polygonal mirror and a metal mold of the polygonal mirror using the metal mold will be described.

Figure 1:
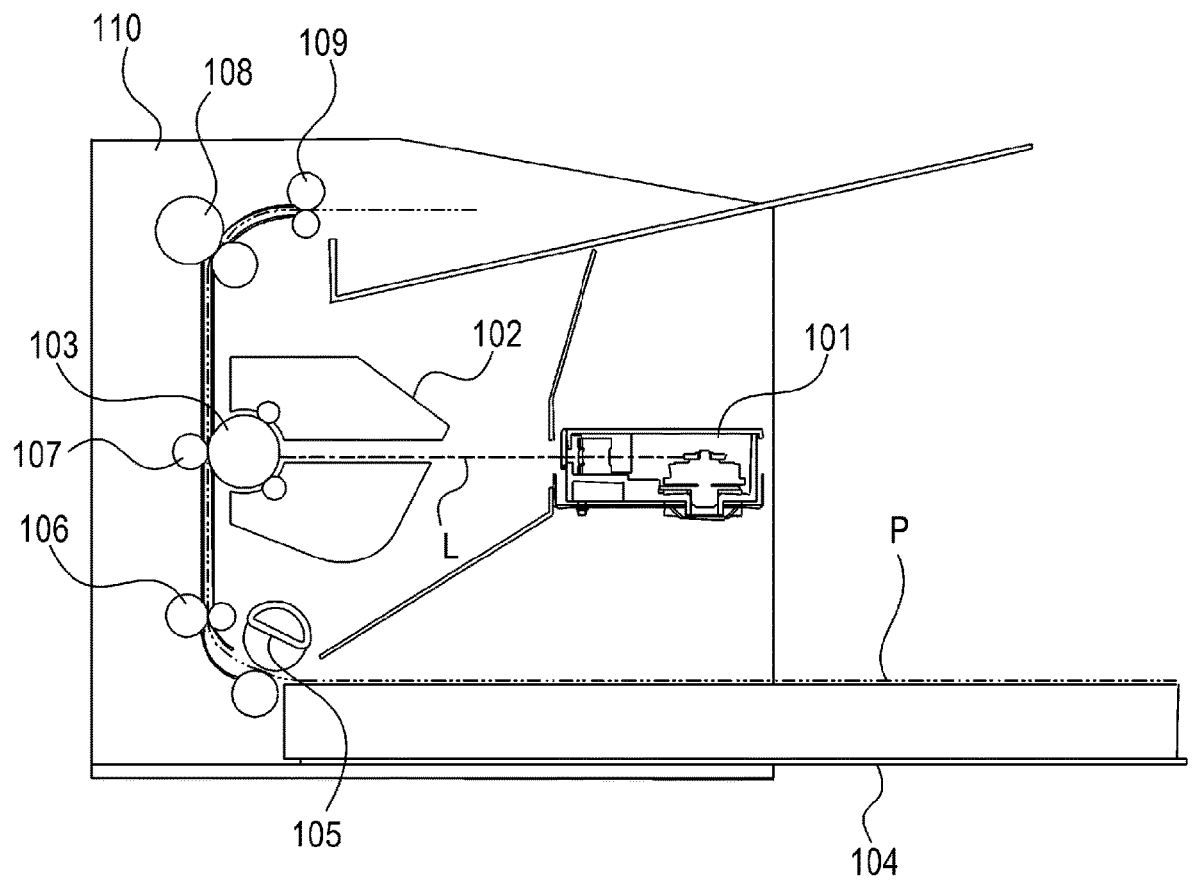
FIG. 1 is an illustration of an image forming apparatus.

FIG. 1 is an illustration of the image forming apparatus 110 according to Embodiment 1. The image forming apparatus 110 according to this embodiment includes the optical scanning apparatus 101 and is an image forming apparatus such that a photosensitive drum 103 is scanned with laser light L by the optical scanning apparatus 101 and then an image is formed on a recording material P such as recording paper on a basis of a latent image formed by scanning. In this embodiment, description will be made using a printer as an example of the image forming apparatus.

As shown in FIG. 1, in the image forming apparatus (printer) 110, the laser light L based on acquired image information is emitted by the optical scanning apparatus 101 as an exposure means, and a surface of the photosensitive drum 103 as an image bearing member incorporated in a process cartridge 102 is irradiated with the laser light L. Then, the latent image is formed on the photosensitive drum 103, and is visualized (developed) as a toner image with toner as a developer by the process cartridge 102. Incidentally, the process cartridge 102 integrally includes the photosensitive drum 103 and a charging means, a developing means and the like as process means actable on the photosensitive drum 103 and is mountable in and dismountable from the image forming apparatus 110.

On the other hand, recording materials P stacked on a recording material stacking plate 104 are fed while being separated one by one by a feeding roller 105 and is further fed toward a downstream side by an intermediary roller pair 106. Onto the fed recording material P, the toner image formed on the photosensitive drum 103 is transferred by a transfer roller 107. The recording material P on which an unfixed toner image is formed is fed toward a further downstream side, and then the toner image is fixed on the recording material P by a fixing device 108 including a heating member therein. Thereafter, the recording material P is discharged to an outside of the image forming apparatus 110 by a discharging roller pair 109.

Incidentally, in this embodiment, the charging means and the developing means which are used as the process means actable on the photosensitive drum 103 are integrally assembled with the photosensitive drum 103 in the process cartridge 102, but the process means may also be constituted as separate members from the photosensitive drum 103.

Figure 2:
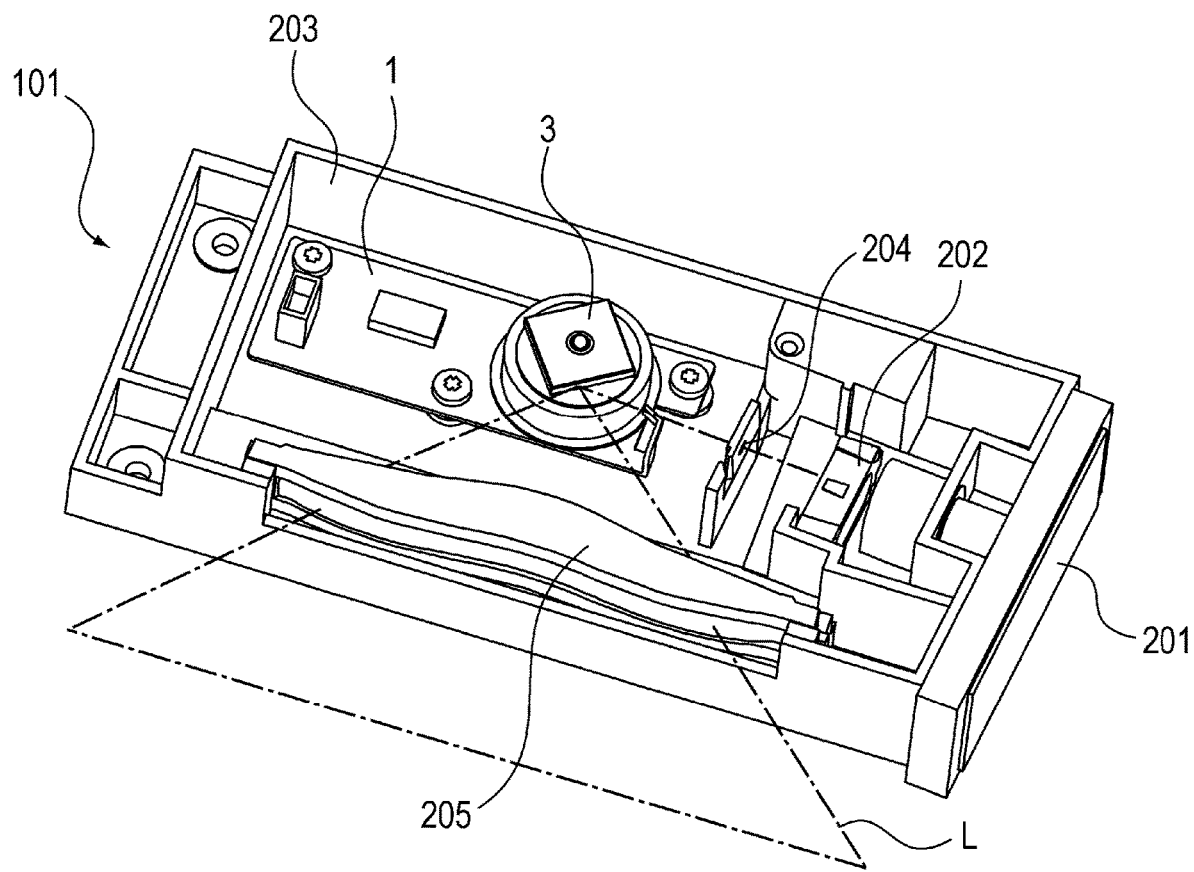
FIG. 2 is a perspective view of an optical scanning apparatus.

Next, the optical scanning apparatus 101 in the image forming apparatus 110 will be described using FIG. 2. FIG. 2 is a perspective view showing a structure of the optical scanning apparatus 101 of this embodiment.

The laser light L emitted from a light source device 201 as a light source is focused in a sub-scan direction by a cylindrical lens 202 and is limited to a predetermined beam diameter by an optical aperture stop 204 formed in a casing 203. The laser light L is deflected by a polygonal mirror 3 rotationally driven by a scanner motor 1 which is a deflector and passes through an fθ lens 205, and thereafter is focused on an unshown image bearing member. The image bearing member is scanned with the laser light L, so that an electrostatic latent image is formed. Incidentally, the light source device 201, the cylindrical lens 202, the scanner motor 1 and the like are accommodated in the casing 203, and an opening of the casing 203 is closed (covered) by an optical cap (not shown) made of a resin material or metal.

Figure 3:
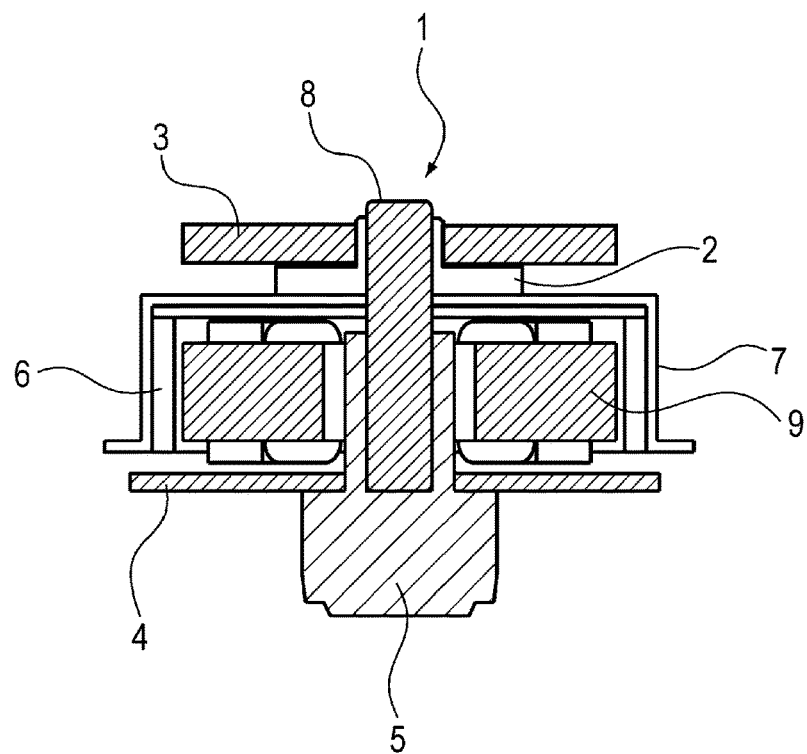
FIG. 3 is an illustration of a scanner motor.

Next, the scanner motor 1 which is the deflector in the optical scanning apparatus will be described using FIG. 3. FIG. 3 is a sectional view including a rotation center of the scanner motor 1.

The scanner motor 1 is constituted by the polygonal mirror 3, a rotor 7, a rotation shaft 8, a polygonal mirror seat 2 for mounting the polygonal mirror 3, a substrate 4, a bearing sleeve 5 provided integrally with the substrate 4, a stator coil 9, and the like. The polygonal mirror 3 deflects the laser light (light flux (beam)) L emitted from the light source device 201, so that the photosensitive drum surface is scanned with the laser light L. The bearing sleeve 5 is supported by the substrate 4 constituted by a metal plate. The rotor 7 includes a rotor magnet 6. The rotation shaft 8 is provided integrally with the rotor 7. The polygonal mirror seat 2 is used for mounting the rotation shaft 8 and the polygonal mirror 3.

Figure 4:
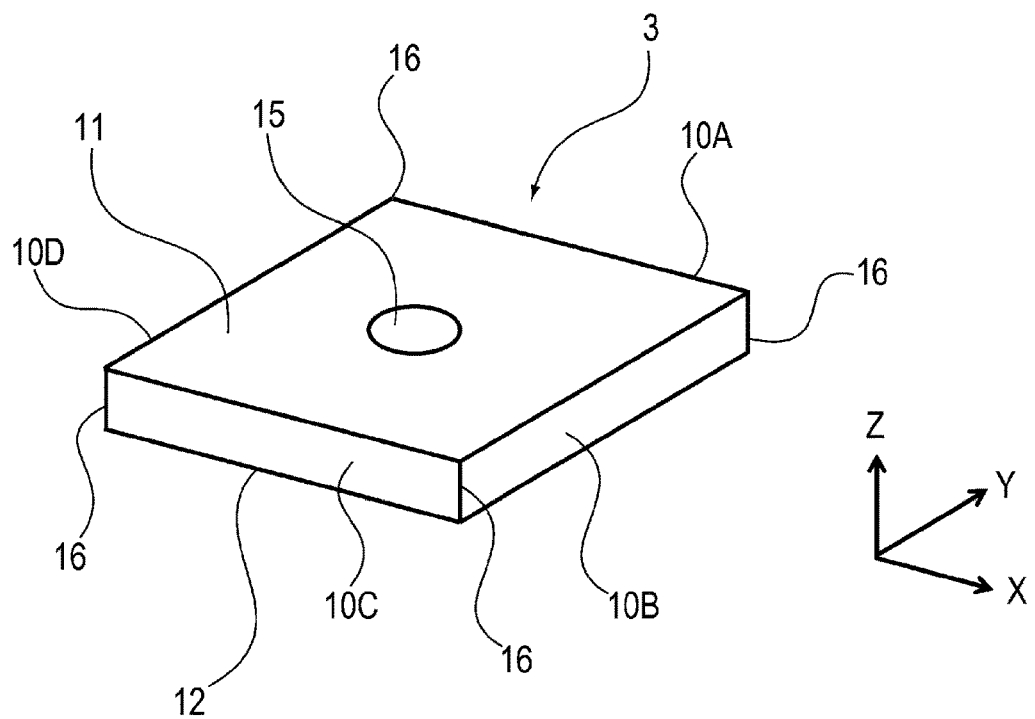
FIG. 4 is a perspective view of a polygonal mirror according to Embodiment 1.

Next, the polygonal mirror 3 in the scanner motor 1 will be described using FIG. 4. FIG. 4 is a perspective view of the polygonal mirror 3 according to this embodiment. An arrow Z direction shown in FIG. 4 is an axial direction (axial direction) of the rotation shaft 8 shown in FIG. 2. An arrow X direction is a direction perpendicular to the arrow Z direction, and an arrow Y direction is a direction perpendicular to the arrow Z direction and the arrow X direction. Also in other figures, a relationship among the arrow X direction, the arrow Y direction and the arrow Z direction is the same.

The polygonal mirror 3 is molded with a resin material such as cycloolefin resin, polycarbonate resin or acrylic resin, in a molded member including a bottom (surface) 12 which is a first surface, a top surface 11 which is a second surface on a side opposite from the bottom 12, and a plurality of side surfaces which are third surfaces. In this embodiment, the polygonal mirror 3 is formed in a prism shape of 14.1 mm in (one) side (circumscribed circle of 20 mm in diameter). The side surfaces of the polygonal mirror 3 are surfaces where reflecting surfaces are formed.

That is, on these side surfaces of the polygonal mirror 3, a metal layer is provided, so that the above-described reflecting surfaces 10A, 10B, 10C and 10D for changing (reflecting) the laser light are formed. In this embodiment, the four reflecting surfaces 10A-10D of the polygonal mirror 3 are constituted by a thin film of metal such as aluminum, copper, silver or the like, and are formed in a film by vacuum deposition, for example.

The reflecting surfaces 10A-10D as the side surfaces of the polygonal mirror 3 are a plurality of third surfaces crossing the bottom 12 and the top surface 11 between the bottom 12 and the top surface 11, and in this embodiment, flat surfaces perpendicular to the bottom 12 and the top surface 11 are illustrated as the reflecting surfaces 10A-10D. Further, the polygonal mirror 3 is provided with a protective layer on the reflecting surfaces formed in the thin film of the metal. Incidentally, in this embodiment, an example of the reflecting surfaces provided by forming the metal layer on the four side surfaces of the polygonal mirror 3 is described, but the present invention is not limited thereto.

The side surfaces (flat surfaces) of the polygonal mirror molded with the resin material may also be the reflecting surfaces. Further, a thickness of the polygonal mirror (resin member) 3 may suitably be 1.0 mm-3.0 mm. Further, the polygonal mirror 3 is provided with a through hole 15 penetrating from the top surface 11 to the bottom 12, and the polygonal mirror seat 2 of the scanner motor 1 is inserted into the through hole 15. Boundary portions (edge line portions) between adjacent reflecting surfaces 10A-10D, parting lines 16 are formed. That is, the parting line 16 is formed at the boundary portion between the reflecting surfaces 10A and 10B (as a first reflecting surface and a second reflecting surface, respectively) which are adjacent to each other. Also at another boundary portion (edge line portion) between other adjacent reflecting surfaces, another parting line 16 is formed. The polygonal mirror 3 is fixed to the polygonal mirror seat 2 by a fixing means such as an unshown adhesive. Here, the parting lines 16 formed at the boundary portions between the adjacent side surfaces (reflecting surfaces) of the polygonal mirror 3 are projections each projecting from the polygonal mirror 3 as shown in part (a) of FIG. 11 (hereinafter, the parting line 16 is also referred to as the projection). The projections 16 formed at the boundary portions between the adjacent reflecting surfaces 10A-10D of the polygonal mirror 3 are formed when the polygonal mirror 3 is manufactured using a metal mold described later. As regards the polygonal mirror 3 shown in part (a) of FIG. 11, the projections 16 as the parting lines formed at the boundary portions between the adjacent reflecting surfaces of the polygonal mirror 3 shown in FIG. 4 are illustrated in an easy-to-understand manner.

Then, a structure of the metal mold for molding the molded member for the polygonal mirror 3 will be described using parts (a) and (b) of FIG. 5. Part (a) of FIG. 5 is an illustration of a metal mold 20. Part (b) of FIG. 5 is an arrangement illustration of reflecting surface dies 24.

As shown in part (a) of FIG. 5, the metal mold 20 for molding the molded member for the polygonal mirror 3 is constituted principally by a movable (-side) die plate 21 as a first mold, a fixed (-side) die plate 22 as a second mold, a stripper plate 23, and a plurality of reflecting surface dies 24. As the plurality of reflecting surface dies 24, in this embodiment, four reflecting surface dies 24A-24D are illustrated, but the present invention is not limited thereto. The reflecting surface dies 24 may also be appropriately set depending on the number of necessary reflecting surfaces. The movable die plate 21 as the first mold includes a bottom molding surface 25 as a first molding surface for molding the bottom 12 of the polygonal mirror 3 and a through hole molding surface 26 for molding the through hole 15 of the polygonal mirror 3. The fixed die plate 22 as the second mold includes a top surface molding surface 27 as a second molding surface for molding the top surface 11 of the polygonal mirror 3. The top surface molding surface 27 of the fixed die plate 22 is disposed opposed to the bottom molding surface 25 of the movable die plate 21 when the polygonal mirror 3 is prepared by molding. The reflecting surface dies 24 as a third mold and a fourth mold include reflecting surface molding surfaces 28 as third and fourth molding surfaces for molding the reflecting surfaces 10 of the polygonal mirror 3.

In this embodiment, in order to prepare the polygonal mirror 3 including the four side surfaces (reflecting surfaces) by molding, the four reflecting surface dies each including the molding surface for molding the reflecting surface are illustrated, but the present invention is not limited thereto. For example, in order to mold the polygonal mirror 3 including the four side surfaces (reflecting surfaces), the plurality of reflecting surface dies may also be constituted as follows. That is, a constitution in which as the plurality of reflecting surface dies constituting the metal mold, a reflecting surface die as a third mold including two third molding surfaces for molding two reflecting surfaces and a reflecting surface die as a fourth mold including two fourth molding surfaces for molding two reflecting surfaces are provided may also be employed.

Further, in the metal mold 20 shown in part (a) of FIG. 5, a constitution in which contact surfaces of the movable die plate 21 with the respective reflecting surface dies 24 are flat surfaces flush with the bottom molding surface 25 and in which the fixed die plate 22 includes recessed contact portions contacting the respective reflecting surface dies 24 was illustrated, but the present invention is not limited thereto. For example, a constitution in which contact surfaces of the fixed die plate 22 with the reflecting surface dies 24 are flat surfaces flush with the top surface molding surface 27 and in which the movable die plate 21 includes recessed contact portions contacting the reflecting surface dies 24 may also be employed. Further, in the metal mold 20 shown in part (a) of FIG. 5, a cross-sectional shape of the reflecting surface dies 24 with respect to an axial direction (arrow Z direction) is a trapezoidal shape having inclined at the contact portions with the fixed die plate 22. The contact portions of the reflecting surface dies 24 on the fixed die plate 22 side are provided at end portions of the reflecting surface molding surfaces 28 with respect to a widthwise direction (arrow Z direction) and contact the opposing recessed contact portions (inclined surface portions) of the fixed die plate 22. The cross-sectional shape of the reflecting surface dies is not limited to the trapezoidal shape having the above-described inclined surface, but may also be a quadrilateral shape such as a rectangular shape. In this case, the contact portions of the reflecting surface dies with the movable die plate and the fixed die plate are flat surfaces which are provided at end portions with respect to the widthwise direction (arrow Z direction) of the reflecting surface molding surfaces and which are flush with the reflecting surface molding surfaces. Further, the corresponding movable die plate or fixed die plate may only be required to include the recessed contact portions contacting the contact portions of the rectangular reflecting surface dies.

Each of the reflecting surface dies 24 is interposed between the movable die plate 21 and the fixed die plate 22 when the polygonal mirror is molded, and is disposed so that the associated reflecting surface molding surface 28 thereof crosses the bottom molding surface 25 and the top surface molding surface 27. Here, a direction in which each of the side surfaces (reflecting surfaces) of the polygonal mirror molded by the reflecting surface molding surfaces as the third and fourth molding surfaces of the reflecting surface dies crosses the top surface and the bottom of the polygonal mirror is the axial direction (arrow Z direction) providing a rotation center of the polygonal mirror. By the above-described various molding surfaces 25-28, a cavity 29 as a molding space corresponding to the shape (the prism shape in this embodiment) of the polygonal mirror 3 is formed. Incidentally, the movable die plate 21 includes a plurality of ejector pins 30. Further, the fixed die plate 22 includes runners 31 through which the resin material flows and a plurality of gates 32 through which the resin material is injected into the cavity 29.

As shown in part (b) of FIG. 5, the reflecting surface dies 24 in the metal mold 20 comprises the four reflecting surface dies 24A-24D corresponding to four reflecting surfaces 10A-10D of the polygonal mirror 3. The reflecting surface dies 24A-24D include reflecting surface molding surfaces 28A-28D, respectively, corresponding to the four reflecting surfaces 10A-10D, respectively, of the polygonal mirror 3. Each of the reflecting surface dies 24A-24D includes contact portions 33 with adjacent reflecting surface dies on both sides thereof with respect to a longitudinal direction of the associated reflecting surface molding surface 28. The four reflecting surface dies 24A-24D contact the adjacent reflecting surface dies at the contact portions 33 during molding. The respective reflecting surface dies 24A-24D are provided so as to be capable of being separated in a direction perpendicular to the reflecting surface molding surfaces 28A-28D, respectively. That is, each of the reflecting surface dies 24A-25D is provided so that the reflecting surface molding surface thereof is capable of being separated from the associated side surface (reflecting surface) of the polygonal mirror 3.

Then, a metal mold of the polygonal mirror 3 will be described using FIGS. 5 and 6. Part (a) of FIG. 6 is an illustration of the projection 16 as the parting line at the contact portion 33 of the reflecting surface dies 24. Part (b) of FIG. 6 is an illustration during parting of the polygonal mirror 3.

First, as shown in part (a) of FIG. 5, the cavity 29 which is a space, as a molding space, into which the resin material is to be injected is formed by clamping the movable die plate 21, the fixed die plate 22 and the reflecting surface dies 24. That is, the four reflecting surface dies 24A-24D are disposed between the movable die plate 21 and the fixed die plate 22 so that the reflecting surface dies 24A-24D are in contact with each other. At that time, the adjacent reflecting surface dies 24A-24D are disposed so that their contact portions 33 are in contact with each other and so that the reflecting surface molding surfaces 28A-28D thereof cross each other. Thus, the cavity 29 as the molding space, defined by the bottom molding surface 25, the top surface molding surface 27 and the four reflecting surface molding surfaces 28, for permitting molding of the polygonal mirror 3 is formed.

Then, the polygonal mirror 3 is molded by injecting the resin material into the cavity 29 through the gates 32. In part (a) of FIG. 6, a state of the parting line 16 at the contact portion 33 between the reflecting surface dies 24A and 24B are shown as a representative. When the resin material is filled in the cavity 29, the resin material slightly enters the contact portion 33 between the adjacent reflecting surface dies, so that the projection 16 as the parting line between the adjacent reflecting surface dies of the polygonal mirror 3 is formed.

Next, after the resin material injected in the cavity 29 is solidified, as shown in part (b) of FIG. 6, the movable die plate 21 and the reflecting surface dies 24 are separated from the polygonal mirror 3. At this time, first, the reflecting surface dies 24 are separated in a direction perpendicular to the reflecting surface molding surfaces 28 thereof. That is, the respective reflecting surface dies 24A-24D are separated in a direction crossing the reflecting surfaces (crossing surfaces) of the polygonal mirror 3 and in a direction in which the reflecting surface molding surfaces of the respective reflecting surface dies are separated from the side surfaces (reflecting surfaces) of the polygonal mirror 3. In part (a) of FIG. 6, the reflecting surface die 24A is separated in Y direction, and the reflecting surface die 24B is separated in X direction. Then, the movable die plate 21 is separated in the axial direction. Thereafter, the polygonal mirror 3 which is the molded member is pushed out form the movable die plate 21 by the ejector pins 30, so that the polygonal mirror 3 is parted from the metal mold.

Through such a step, the polygonal mirror 3 made of the resin material is manufactured. The polygonal mirror 3 made of the resin material manufactured by the above method is molded in the molded member including the top surface 11 molded by the top surface molding surface 27, the bottom 12 molded by the bottom molding surface 25, and the plurality of side surfaces (reflecting surfaces) molded by the plurality of reflecting surface molding surfaces 28A-28D. Further, on the polygonal mirror 3, the projections 16 as the parting lines are formed at the boundary portions of the adjacent side surfaces (reflecting surfaces). Specifically, as shown in FIG. 4 and part (a) of FIG. 11, the polygonal mirror 3 including the projections 16 formed at the boundary portions of the adjacent side surfaces (reflecting surfaces) is molded.

In the following, an effect of this embodiment will be described in comparison with Comparison Example 1.

First, Comparison Example 1 will be described using parts (a) and (b) of FIG. 7. Part (a) of FIG. 7 is an illustration of a metal mold 50 for molding a polygonal mirror 40 of Comparison Example. Part (b) of FIG. 7 is an illustration of the polygonal mirror of Comparison Example 1 during parting of the polygonal mirror 40.

As shown in part (a) of FIG. 7, the metal mold 50 of Comparison Example 1 is constituted by a movable die plate 51, a fixed die plate 52 and a stripper plate 23. The movable die plate 51 of Comparison Example 1 includes a bottom molding surface 55 for molding a bottom of the polygonal mirror 40, a through hole molding surface 56 for molding a through hole of the polygonal mirror 40, and reflecting surface molding surfaces 58 for molding reflecting surfaces 44 of the polygonal mirror 40. The fixed die plate 52 includes a top surface molding surface 57 for molding a top surface of the polygonal mirror 40. Thus, the metal mold 50 in Comparison Example 1 does not include the reflecting surface dies as in the metal mold 20 in this embodiment. For this reason, as regards the polygonal mirror 40 of Comparison Example 1, the projections of the parting lines are not formed at boundary portions of the adjacent reflecting surfaces 44. Further, in the case of a constitution of the metal mold 50 in Comparison Example 1 in which the reflecting surface dies are not provided, as shown in part (b) of FIG. 7, during parting, the reflecting surfaces 44 of the polygonal mirror 40 are subjected to stress τ exerted from the reflecting surface molding surfaces 58 of the movable die plate 51 in a shearing direction. For that reason, a possibility that the reflecting surfaces 44 of the polygonal mirror 40 are deformed during parting of the polygonal mirror 40 and a possibility that accuracy of the reflecting surfaces 44 of the polygonal mirror 40 cannot be maintained by the influence of residual stress increase.

On the other hand, as regards the polygonal mirror 3 of this embodiment, the projections 16 as the parting lines are formed at the boundary portions of the adjacent reflecting surfaces 10A-10D. This is because the contact portions of the adjacent reflecting surface dies 24 are contacted to each other by providing the plurality of reflecting surface dies 24 including the reflecting surface molding surfaces corresponding to the reflecting surfaces of the metal mold 20, so that the projections are formed at the boundary portions of the adjacent reflecting surfaces. Further, during parting, the reflecting surface dies 24 are separated in directions perpendicular to the associated reflecting surface molding surfaces 28, so that the reflecting surfaces 10 of the polygonal mirror 3 is not subjected to the shearing force exerted as in Comparison Example 1. For that reason, deformation of the reflecting surfaces 10 due to exertion of the shearing force can be prevented, so that accuracy of the reflecting surfaces can be maintained at a high level.

Incidentally, in this embodiment, the polygonal mirror 3 including the four reflecting surfaces was described, but the present invention is not limited thereto. The number of the reflecting surfaces, positions of the gates, and shapes of these may also be other constitutions.

Further, in this embodiment, all the molded members are the polygonal mirrors 3 made of the resin material were described, but the present invention is not limited thereto. The molded member may also be constituted by a plurality of materials. For example, a constitution in which inside a molded member including a plurality of reflecting surfaces and made of a resin material, a second material such as a metal material higher in Young's modulus than the resin material is provided may also be employed. That is, the polygonal mirror 3 may also have a constitution in which a base material made of the metal material such as aluminum, iron, stainless steel or a steel plate is provided inside the molded member molded with the resin material and including a plurality of reflecting surfaces.

Further, in this embodiment, the constitution in which the projection 16 as the parting line is formed at all the boundary portions (four sides in this embodiment) between the adjacent reflecting surfaces was described, but the present invention is limited thereto. The projection 16 may also be provided only at a part of the boundary portions between the adjacent reflecting surfaces. That is, the number of the reflecting surface dies 24 may also be not equal to the number of the reflecting surfaces 10. For example, in the case where four reflecting surfaces are molded, a constitution in which the projections as the parting lines are formed at least in two boundary portions of the boundary portions between the adjacent reflecting surfaces may also be employed. In this case, two reflecting surface dies are used, and a separating direction is a direction forming an angle of 45° with a normal to the reflecting surface. Also in this case, the shearing stress exerted on the reflecting surface can be made smaller than that in the constitution of Comparison Example 1, and therefore, a degree of deformation of the reflecting surface due to exertion of the shearing force (stress) can be reduced and thus high accuracy of the reflecting surface can be expected.

Modified Embodiment of Embodiment 1

Then, a modified embodiment of Embodiment 1 will be described using FIGS. 8 to 10. Incidentally, constitutions of an image forming apparatus including an optical scanning apparatus except for a polygonal mirror are similar to those in Embodiment 1, and therefore will be omitted from description. Further, portions relating to the above-described polygonal mirror 3 and common to Embodiment 1 and this modified embodiment are represented by the same reference numerals or symbols and will be omitted from description.

A polygonal mirror 60 according to the modified embodiment of Embodiment 1 will be described using FIG. 8. FIG. 8 is a perspective view of the polygonal mirror 60. A difference of the polygonal mirror 60 shown in FIG. 8 from the polygonal mirror 3 shown in FIG. 4 is in that four reflecting surfaces 61A-61D of the polygonal mirror 60 are constituted by curved surfaces curved along Z axis which is an axial direction of the rotation shaft 8 (FIG. 3). The curved surfaces are surfaces where the reflecting surfaces are to be formed. That is, the reflecting surfaces 61A-61D are formed by providing a thin film of a metal material such as aluminum, copper or silver, on each of the curved surfaces of the polygonal mirror 60. Further, the polygonal mirror 60 is provided with a protective layer on the reflecting surfaces formed in the thin film of the metal. Incidentally, in this embodiment, an example of the reflecting surfaces provided by forming the metal layer on the four curved surfaces (side surfaces) of the polygonal mirror 3 is described, but the present invention is not limited thereto. The side surfaces (curved surfaces) of the polygonal mirror molded with the resin material may also be the reflecting surfaces. Further, a thickness of the polygonal mirror (resin member) 3 may suitably be 1.0 mm-3.0 mm. Also as regards the polygonal mirror 60 shown in FIG. 8, projections 62 as the parting lines formed at boundary portions (edge lines) between the adjacent reflecting surfaces 61A-61D.

Then, a structure of a metal mold used for molding the polygonal mirror 60 will be described using parts (a) and (b) of FIG. 9. Part (a) of FIG. 9 is an illustration of a metal mold 70 used for molding the polygonal mirror 60. Part (b) of FIG. 9 is an illustration of the polygonal mirror 60 according to the modified embodiment of Embodiment 1 during parting of the polygonal mirror 60.

As shown in part (a) of FIG. 9, also the metal mold 70 according to the modified embodiment is constituted principally by the movable die plate 21, the fixed die plate 22, the stripper plate 23 and a plurality (four in the modified embodiment) of reflecting surface dies 74 similarly as in the metal mold 20 in Embodiment 1. A difference of the metal mold 70 in the modified embodiment from the metal mold 20 in Embodiment 1 is in that the reflecting surface molding surface 78 of each of the reflecting surface dies 74 is constituted by the curved surface. That is, the reflecting surface molding surface 78 of each of the reflecting surface dies 74 is the curved surface curved from the bottom molding surface 25 toward the top surface molding surface 27 when the reflecting surface dies 74 are disposed between the movable die plate 21 and the fixed die plate 22. The reflecting surface dies 74 are provided so as to be capable of being separated in an XY flat plane and in a direction perpendicular to the reflecting surface molding surfaces 78. Other constitutions of the metal mold 70 are similar to those of the metal mold 20, and therefore, members having the same functions are represented by the same reference numerals or symbols and will be omitted from description.

A metal mold of the polygonal mirror 60 is carried out similarly as the polygonal mirror 3 of Embodiment 1. In this modified embodiment, detailed description will be omitted, but as shown in part (b) of FIG. 9, the reflecting surface dies 74 are separated along the XY flat plane in the direction perpendicular to the reflecting surface molding surfaces 78 during parting of the polygonal mirror 60. That is, the respective reflecting surface dies 74 are separated in a direction in which the reflecting surface molding surfaces 78 of the respective reflecting surface dies 74 are separated from the side surfaces (reflecting surfaces) of the polygonal mirror 60. Thereafter, the polygonal mirror 60 is pushed out by the ejector pins 30, so that the polygonal mirror 60 is parted from the metal mold.

In the following, an effect of the modified embodiment of Embodiment 1 will be described in comparison with Comparison Example 2.

First, Comparison Example 2 will be described using parts (a) and (b) of FIG. 10. Part (a) of FIG. 10 is an illustration of a metal mold 90 for molding a polygonal mirror 80 of Comparison Example 2 in which curved reflecting surfaces 61 are formed. Part (b) of FIG. 10 is an illustration of the polygonal mirror of Comparison Example 2 during parting of the polygonal mirror 80.

As shown in part (a) of FIG. 10, the metal mold 90 of Comparison Example 2 is constituted by a movable die plate 91, a fixed die plate 92 and a stripper plate 23. The movable die plate 91 of Comparison Example 2 includes a bottom molding surface 85 for molding a bottom of the polygonal mirror 80, a through hole molding surface 86 for molding a through hole of the polygonal mirror 80, and reflecting surface molding surfaces 98 for molding reflecting surfaces 84 of the polygonal mirror 80. The fixed die plate 92 includes a top surface molding surface 97 for molding a top surface of the polygonal mirror 80. Thus, the metal mold 90 in Comparison Example 2 does not include the reflecting surface dies as in the metal mold 70 in this modified embodiment. For this reason, as regards the polygonal mirror 80 of Comparison Example 2, the parting lines are not formed between the adjacent reflecting surfaces 84. In the case of the metal mold 90 in Comparison Example 2, as shown in part (b) of FIG. 10, during parting, the reflecting surfaces 84 of the polygonal mirror 80 are curved surfaces, and therefore constitute undercuts, so that the polygonal mirror 80 cannot be pushed out along the separating direction of the metal mold. Here, the undercuts refer to projected portions and recessed portions such that the polygonal mirror 80 cannot be parted from the metal mold as it is when the molded member is taken out from the metal mold.

On the other hand, the polygonal mirror 60 in this modified embodiment can be taken out from the metal mold by separating the reflecting surface dies 74 along the XY flat plane.

Further, also as regards the polygonal mirror 60 of this modified embodiment, similarly as Embodiment 1, the projections 62 as the parting lines are formed between the adjacent reflecting surfaces 61A-61D. This is because the contact portions between the adjacent reflecting surface dies 74 are contacted to each other by providing the reflecting surface dies 74 including the reflecting surface molding surfaces corresponding to the reflecting surfaces of the metal mold 90, so that the parting lines between the adjacent reflecting surfaces are formed. Further, during parting, the reflecting surface dies 74 are separated in directions perpendicular to the associated reflecting surface molding surfaces 98, so that the reflecting surfaces 61 of the polygonal mirror 60 is not subjected to the shearing force exerted as in Comparison Example 2. For that reason, deformation of the reflecting surfaces 61 due to exertion of the shearing force can be prevented, so that accuracy of the reflecting surfaces can be maintained at a high level.

Incidentally, the shape of the reflecting surfaces of the polygonal mirror is not limited to the shape of the reflecting surfaces 61 in this modified embodiment, but may also be other shapes.

As described above, also in this modified embodiment, similarly as the above-described Embodiment 1, by providing the parting lines between the adjacent reflecting surfaces of the polygonal mirror made of the resin material, the shearing stress exerted on the reflecting surfaces from the metal mold during parting of the polygonal mirror can be reduced, so that the reflecting surfaces can be maintained with high accuracy.

Then, a polygonal mirror according to Embodiment 2 will be described using the polygonal mirror of Embodiment 1 shown in part (a) of FIG. 11. Incidentally, in this embodiment, constitutions of an image forming apparatus including an optical scanning apparatus except for a polygonal mirror are similar to those in Embodiment 1, and therefore will be omitted from description. Further, portions relating to the polygonal mirror and common to Embodiment 1 and Embodiment 1 are represented by the same reference numerals or symbols and will be omitted from description.

First, the polygonal mirror 3 of Embodiment 1 will be described using FIGS. 11 and 12. Parts (a) and (b) of FIG. 11 and parts (a), (b) and (c) of FIG. 12 are illustrations of the polygonal mirror 3 of Embodiment 1.

As shown in part (a) of FIG. 11, the polygonal mirror 3 of Embodiment 1 includes the projections 16 (so-called burrs) as the parting lines formed between the adjacent reflecting surfaces 10A-10D. Each of the projections 16 is formed at a boundary portion of a first reflecting surface and a second reflecting surface which are adjacent to each other. In this case, reflecting surface dies which is the same in number as reflecting surfaces of the polygonal mirror 3 are used, so that the projections 16 are formed at all the boundary portions between the first and second reflecting surfaces. That is, the projection 16 is formed at each of the boundary portion of the reflecting surfaces 10A and 10B, the boundary portion of the reflecting surfaces 10B and 10C, the boundary portion of the reflecting surfaces 10C and 10D, and the boundary portion of the reflecting surfaces 10D and 10A. This projection 16 is formed in some instances by flowing of the resin material into the contact portion 33 between the reflecting surface dies of the metal mold 20 as shown in part (a) of FIG. 6. An amount in which the resin material flows into the contact portion between the reflecting surfaces, i.e., a size of the projection (projection amount) is determined by various conditions such as a kind of the resin material, a filling pressure of the resin material, an injection speed of the resin material, a holding pressure and a degree of abrasion (wearing) of the metal mold. Depending on setting of these conditions, in some instances, the projections 16 are formed at the boundary portions between the adjacent reflecting surfaces as in the polygonal mirror 3. For example, in this embodiment, a length l of each of the reflecting surfaces of the polygonal mirror 3 with respect to a longitudinal direction is 14.1 mm, but in this case, when a projection amount h (part (b) of FIG. 11) is larger than 1 mm, there is a possibility as described below.

Here, a length (projection amount) h of the projection 16 shown in part (b) of FIG. 11 will be described. The length (projection amount) h of the projection 16 is a length from a point C of intersection of extension lines of the adjacent reflecting surfaces 10A and 10B to a free end of the projection 16. In this embodiment, as the length (projection amount) h of the projection 16, a length from the point C to the free end of the projection 16 on a rectilinear line connecting the point C of intersection of the adjacent reflecting surfaces 10A and 10B with a rotation center (center of the through hole) D of the polygonal mirror 3 is shown as an example.

As shown in part (a) of FIG. 12, the polygonal mirror 3 is subjected to large air resistance since there is no obstacle to collision of air with the projection 16 during rotation. For that reason, there is a possibility that wind noise of the polygonal mirror 3 increases. Further, as shown in part (b) of FIG. 12, in the case where the projection 16 falls of the polygonal mirror 3, there is a possibility that the projection 16 deposits on an optical component part such as the fθ lens 205 of the optical scanning apparatus 101. Further, as shown in part (c) of FIG. 12, in the case where the projection 16 blocks the laser light L, there is a possibility that image deterioration due to a lowering in light quantity and stray light occurs.

Here, for example, when the filling pressure of the resin material into the metal mold and the holding pressure are positively decreased, the projection amount of the projection 16 can be reduced. However, in order to form the reflecting surfaces 10 with high accuracy, there is a need to accurately transfer the shape of the metal mold, and therefore, it is desirable that the filling pressure and the holding pressure are not made small. Therefore, in this embodiment, a different countermeasure is taken in the following manner.

Next, a characteristic structure of the polygonal mirror according to Embodiment 2 will be described using FIG. 13. FIG. 13 is a top plan view of a polygonal mirror 310 according to Embodiment 2.

As shown in FIG. 13, in the polygonal mirror 310 according to this embodiment, a difference from the polygonal mirror 3 according to Embodiment 1 is that a connecting portion 311 is provided between adjacent two reflecting surfaces of the reflecting surfaces 10A-10D. The connecting portion 311 crosses the adjacent two reflecting surfaces and connects an end portion of one reflecting surface (first reflecting surface) of the adjacent two reflecting surfaces with an end portion of the other reflecting surface (second reflecting surface). Thus, each of four connecting portions 311 is provided between associated adjacent two reflecting surfaces of the reflecting surfaces 10A-10D, so that the projections 16 are formed on the connecting portions 311.

The connecting portion 311 forms a space between the reflecting surface 10A as the first reflecting surface and the reflecting surface 10B as the second reflecting surface, and the projection 16 is in the space and is disposed on the connecting portion 311. This space is a region ABC comprising the point (phantom point) C of intersection of extension lines of the adjacent reflecting surfaces 10A and 10B, an end portion A which is a connecting point of the reflecting surface 10A with the connecting portion 311, and an end portion B which is a connecting point of the reflecting surface 10B with the connecting portion 311. The projection 16 is disposed so as to fall within the space (region ABC) formed by the connecting portion between the adjacent reflecting surfaces. Also between other adjacent reflecting surfaces 10B and 10C, 10C and 10D, and 10D and 10A, associated connecting portions 311 are provided, respectively, so that associated spaces 311 are formed.

Further, the above-described space (region ABC) formed by the connecting portion 311 is symmetrical with respect to the rectilinear line (a chain line shown in part (b) of FIG. 11), as a center line, connecting the rotation center D of the polygonal mirror with the point C of intersection of the extension lines of the adjacent reflecting surfaces.

Incidentally, a state in which the projection 16 falls within a triangular space (region ABC) refers to that a length (projection amount) of the projection 16 is smaller than a length of a line segment MC connecting an midpoint M of line segment AB with the point C of intersection of the extension lines of the adjacent reflecting surfaces. Incidentally, the length (projection amount) h of the projection 16 varies depending on a molding condition, but is 0.5 mm or less.

Then, an effect of Embodiment 2 will be described using parts (a) and (b) of FIG. 14. Parts (a) and (b) of FIG. 14 are enlarged views of the connecting portion between the reflecting surfaces of the polygonal mirror 310 according to this embodiment.

As shown in part (a) of FIG. 14, by providing the connecting portion 311 between the adjacent (two) reflecting surfaces, when the polygonal mirror 310 is rotated, an air flow directly blowing onto the projection 16 can be reduced. For that reason, the possibility of the image deterioration due to the wind noise and the falling-off of the projection 6 can be reduced. Incidentally, the projection 16 may further preferably be positioned inside a circumscribed circle O of the polygonal mirror 310. Further, as shown in part (b) of FIG. 14, by disposing the projection 16 so as to fall within the triangular region (region ABC), it is possible to reduce a possibility that the image deterioration due to the lowering in light quantity and the stay light caused by the block of the laser light L by the projection 16.

Incidentally, the shape of the connecting portion 311, and the position and the shape of the projection 16 are not limited to those in the constitution of the polygonal mirror 310 in this embodiment.

For example, forms as shown in parts (a) and (b) of FIG. 15 may also be employed. Parts (a) and (b) of FIG. 15 are enlarged views of connecting portions between reflecting surfaces of polygonal mirrors according to Embodiment 2. Part (a) of FIG. 15 shows a polygonal mirror 320 in which a connecting portion 321 between the adjacent reflecting surfaces is constituted by a curved surface recessed in a direction toward a rotation center of the polygonal mirror

320. Part (b) of FIG. 15 shows a polygonal mirror 330 in which a connecting portion 331 between the adjacent reflecting surfaces is constituted by a plurality of surfaces recessed in a direction toward a rotation center of the polygonal mirror 330. In the polygonal mirrors 320 and 330, compared with the polygonal mirror 310, the projections 16 can be disposed at positions closer to the rotation centers than the position of the projection 16 of the polygonal mirror 310 is, and therefore, the air flow directly blowing onto the projection 16 can be further reduced.

Further, the connecting portions 311, 321 and 331 may also be constituted so that surface roughness thereof is larger than roughness of the reflecting surfaces 10. As a result, the possibility that the image deterioration occurs due to the stray light can be reduced.

As described above, according to this embodiment, by providing the connecting portion between the adjacent reflecting surfaces and by providing the projection as the parting line of the connecting portion, the influence of the projection formed at the contact portion between the reflecting surface dies can be reduced. Therefore, the possibility of the image deterioration due to the wind noise and the falling-off of the projection can be reduced.

Embodiment 3

Then, a polygonal mirror according to Embodiment 3 will be described. Incidentally, in this embodiment, constitutions of an image forming apparatus including an optical scanning apparatus except for a polygonal mirror are similar to those in Embodiment 1, and therefore will be omitted from description. Further, portions relating to the polygonal mirror and common to Embodiments 1 to 3 are represented by the same reference numerals or symbols and will be omitted from description.

FIG. 16 is an illustration of a polygonal mirror 340 according to Embodiment 3. As shown in FIG. 16, in the polygonal mirror 340 according to this embodiment, different from the polygonal mirror 3 according to Embodiment 1 and the polygonal mirror 310 according to Embodiment 2, not only a connecting portion 341 is provided between associated adjacent two reflecting surfaces of the reflecting surfaces 10A-10D, but also a projected portion 342 is provided on the connecting portion 341. For this reason, a projection 16 including a parting line is formed on the projected portion 342.

An effect of this embodiment will be described using parts (a) and (b) of FIG. 17. Part (a) of FIG. 17 is an enlarged view of reflecting surface dies 350 of a metal mold for molding the polygonal mirror 340 according to this embodiment. Part (b) of FIG. 17 is an enlarged view of the reflecting surface dies 24 in Embodiment 1. Incidentally, in parts (a) and (b) of FIG. 17, of the plurality of reflecting surface dies, as the adjacent crossing surface dies, reflecting surface dies 350A and 350B and the reflecting surface dies 24A and 24B are illustrated, but other reflecting surface dies are also similarly constituted.

As shown in part (a) of FIG. 17, a space 351 corresponding to the projected portion 342 provided at the connecting portion 341 between the adjacent reflecting surfaces of the polygonal mirror 340 is provided between the reflecting surface dies 350A and 350B. For this reason, when the resin material is filled into a space of the metal mold, pressure loss occurs in the space 351, so that the resin material does not readily enter the contact portion 33 between the reflecting surface dies. Accordingly, in order to maintain the reflecting surfaces 10 with high accuracy, even in the case where the polygonal mirror is molded under a condition that the filling pressure and the holding pressure are high, the projection amount of the projection 16 can be made small.

Incidentally, the shape of the connecting portion 341 is not limited to the shapes shown in parts (a) and (b) of FIG. 17. For example, the shape of the connecting portion 341 may also be other shapes, such as the curve surface recessed in the die toward the rotation center of the polygonal mirror, as shown in parts (a) and (b) of FIG. 15. Further, also the shape of the projected portion 342 is not limited to the shapes shown in parts (a) and (b) of FIG. 17, but may also be other shapes when a space such that the pressure loss occurs when the resin material is filled in the space during the molding of the polygonal mirror.

As described above, according to this embodiment, by providing the projected portion provided at the connecting portion between the adjacent reflecting surfaces, the projection amount of the projection can be made small. Therefore, the possibility of the image deterioration due to the wind noise and the falling-off of the projection can be reduced.

Other Embodiments

In the above-described embodiments, as the polygonal mirror including the plurality of reflecting surfaces, a square polygonal mirror having the four reflecting surfaces was described as an example, but the present invention is not limited thereto. The polygonal mirror may appropriately be set as needed so that the shape thereof is a regular pentagon having five reflecting surfaces.

Further, the polygonal mirror including the plurality of reflecting surfaces may also be a polygonal mirror in which an outside of a base material made of a metal material is covered with a molded member made of a resin material. Such a polygonal mirror may for example employ a constitution in which the molded member made of the resin material covers entirety of the outside of the base material made of the metal material. Or, a constitution in which the molded member made of the resin material does not cover a part of the base material made of the metal material may also be employed. Specifically, such a constitution is shown in parts (a), (b) and (c) of FIG. 18. Parts (a) and (b) of FIG. 18 are perspective views of polygonal mirrors as seen from top surface sides, and part (c) of FIG. 18 is a perspective view of a polygonal mirror as seen from a bottom side. Polygonal mirrors 40 shown in parts (a), (b) and (c) of FIG. 18 are configured so that a molded member 41 made of the resin material does not cover holes 42a and 42b and a part of a top surface 42a of a base material 42. Conversely, the part of the top surface 42a is covered with the resin material. Here, the holes 42c of the base material 42 refer to four holes positioned on lines each connecting a rotation center of the polygon with an associated one of apexes of the polygon. In addition to these (four) holes 42c, the base material 42 includes the hole 42b at a central portion thereof constituting the rotation center thereof, and this hole 42b is a through hole in which the polygonal mirror seat (or the rotation shaft) is engageable.

As shown in parts (a) and (b) of FIG. 18, the polygonal mirror 40 has a constitution including the molded member 41 which includes a bottom 45 which is a first surface, reflecting surfaces 44A-44D which are side surfaces, and a top surface 43 covering at least a part of the top surface 42a of the base material 42. The top surface 43 of the molded member 41 is a second surface (positioned on a side opposite from the first surface) covering at least the part of the top surface 42a of the base material 42. In this case, similarly as in the above-described embodiments, gate traces 46A-46D of the top surface 43 which is the second surface of the molded member 41 are provided at positions which do not overlap with weld lines. Incidentally, the polygonal mirror shown in part (a) of FIG. 18 and the polygonal mirror shown in part (b) of FIG. 18 are of types different in range in which the molded member covers the part of the base material on the top surface side.

Incidentally, part (c) of FIG. 18 shows the polygonal mirror 40 on the bottom side. On the bottom side of the polygonal mirror 40, portions other than the holes 42b and 42c of the base material 42 made of the metal material are covered with the molded member 41 made of the resin material. On the bottom 45 which is the first surface of the molded member 41, bearing surfaces 47A-47D are provided at positions which do not overlap with weld lines. In this way, the polygonal mirror having a constitution in which the outside of the base material made of the metal material is covered with the molded member made of the resin material may also be provided.

In the above-described embodiments, as the process cartridge mountable in and dismountable from the image forming apparatus, the process cartridge integrally including the photosensitive drum, and the charging means, the developing means and the cleaning means which are the process means actable on the photosensitive drum was described as an example. However, the present invention is not limited thereto. For example, the process cartridge may also be a process cartridge integrally including, in addition to the photosensitive drum, either one of the charging means, the developing means, the cleaning means.

Further, in the above-described embodiments, the constitution in which the process cartridge including the photosensitive drum is mountable in and dismountable from the image forming apparatus was described as an example, but the present invention is not limited thereto. For example, it is also possible to provide an image forming apparatus in which respective constituent elements are incorporated or an image forming apparatus in which each of the respective constituent elements is mountable in and dismountable from the image forming apparatus.

Further, in the above-described embodiments, as the image forming apparatus, the printer was described as an example, but the present invention is not limited thereto. For example, the image forming apparatus may also be other image forming apparatuses such as a copying machine, a facsimile machine and a multi-function machine having functions of these machines in combination. Further, as the image forming apparatus, the image forming apparatus for forming a monochromatic image was described, but the present invention is not limited thereto. For example, the image forming apparatus may also be an image forming apparatus for forming a color image. By applying the present invention to the optical scanning apparatus, the deflector and the polygonal mirror which are usable in the above-described image forming apparatuses, similar effects can be achieved.

According to the present invention, it is possible to reduce a degree of deformation of the crossing surfaces of the polygonal mirror during parting of the polygonal mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-082893 filed on Apr. 24, 2018, which is hereby incorporated by reference herein in its entirety.

What is claimed is:

1. A polygonal mirror comprising:
   a plurality of reflecting surfaces capable of reflecting a light flux emitted from a light source; and
   a molded member molded with a resin material so as to include a first surface, a second surface on a side opposite from the first surface with respect to a rotational axis direction of the polygonal mirror, and a plurality of side surfaces crossing the first surface and the second surface between the first surface and the second surface,
   wherein, as seen in the rotational axis direction, the side surfaces are flat surfaces,
   wherein the side surfaces are surfaces where the reflecting surfaces are formed,
   wherein of boundary portions of adjacent reflecting surfaces, at least two boundary portions are provided with projections as a parting line in molding, and
   wherein, as seen in the rotational axis direction, each of the projections includes only one edge.

2. The polygonal mirror according to claim 1, wherein of all the boundary portions of the adjacent reflecting surfaces are provided with the projections.

3. The polygonal mirror according to claim 1, wherein the reflecting surfaces are metal layers.

4. The polygonal mirror according to claim 3, wherein the metal layers are formed by vacuum deposition.

5. A polygonal mirror comprising:
   a plurality of reflecting surfaces capable of reflecting a light flux emitted from a light source; and
   a molded member molded with a resin material so as to include a first surface, a second surface on a side opposite from the first surface with respect to a rotational axis direction of the polygonal mirror, and a plurality of side surfaces crossing the first surface and the second surface between the first surface and the second surface; and
   a connecting portion configured to connect end portions of one side surface and an other side surface of adjacent side surfaces of the plurality of side surfaces so as to form a space while crossing the one side surface and the other side surface,
   wherein, as seen in the rotational axis direction, the side surfaces are flat surfaces,
   wherein the side surfaces are surfaces where the reflecting surfaces are formed,
   wherein the connecting portion is provided with a projection, as a parting line in molding, formed in the space formed by the connecting portion,
   wherein the connecting portion forms the space, between a first reflecting surface and a second reflecting surface which are adjacent to each other, defined by a point of intersection of extension lines of the first reflecting surface and the second reflecting surface, a connecting point between the first reflecting surface and the connecting portion, and a connecting point between the second reflecting surface and the connecting portion, and
   wherein the projection is in the space and is disposed at the connecting portion.

6. The polygonal mirror according to claim 5, wherein the connecting portion is provided with a projected portion where the projection is formed.

7. The polygonal mirror according to claim 5, wherein the space formed by the connecting portion is symmetrical with respect to a rectilinear line connecting a rotation center of the polygonal mirror with the point of intersection of the extension lines of the first reflecting surface and the second reflecting surface.

8. The polygonal mirror according to claim 5, wherein the connecting portion is constituted by a curved surface recessed in a direction toward a rotation center of the polygonal mirror.

9. The polygonal mirror according to claim 5, wherein the connecting portion is constituted by a plurality of surfaces recessed in a direction toward a rotation center of the polygonal mirror.

10. The polygonal mirror according to claim 5, wherein the reflecting surfaces are metal layers.

11. The polygonal mirror according to claim 10, wherein the metal layers are formed by vacuum deposition.

\* \* \* \* \*